US012761696B2

(12) United States Patent
Lee et al.

(10) Patent No.: US 12,761,696 B2
(45) Date of Patent: Oct. 13, 2026

(54) DISPLAY DEVICE

(71) Applicant: LG Display Co., Ltd., Seoul (KR)

(72) Inventors: Jeong Jo Lee, Paju-si (KR); Hyo Sup Eum, Paju-si (KR); Dae Yun Kim, Paju-si (KR); Eun Jeong Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 310 days.

(21) Appl. No.: 18/603,101

(22) Filed: Mar. 12, 2024

(65) Prior Publication Data

US 2024/0361808 A1 Oct. 31, 2024

(30) Foreign Application Priority Data

Apr. 28, 2023 (KR) ........................ 10-2023-0056243

(51) Int. Cl.

*H05K 7/20* (2006.01)
*G06F 1/16* (2006.01)
*G06F 1/20* (2006.01)

(52) U.S. Cl.

CPC ............ *G06F 1/1656* (2013.01); *G06F 1/203* (2013.01)

(58) Field of Classification Search

CPC ............. H05K 7/2039; H05K 7/20445; H05K 7/20918; H05K 7/20854; H05K 7/209; H05K 7/20909; G06F 1/20; G06F 1/206; G06F 1/1647; G06F 1/1656

See application file for complete search history.

(56) References Cited

U.S. PATENT DOCUMENTS

| | | | | |
|---|---|---|---|---|
| 9,069,519 | B1 * | 6/2015 | Hall | F21V 31/005 |
| 10,885,835 | B2 * | 1/2021 | Cho | H05K 7/20963 |
| 2003/0067437 | A1 * | 4/2003 | McClintock | G06F 1/1605 345/102 |
| 2016/0307479 | A1 * | 10/2016 | Cox | G09F 9/3026 |
| 2017/0220310 | A1 * | 8/2017 | Hochman | H01R 13/6205 |
| 2018/0199468 | A1 * | 7/2018 | Hall, III | G02B 6/4269 |
| 2019/0123094 | A1 * | 4/2019 | Foster | G06F 3/1446 |
| 2022/0093890 | A1 * | 3/2022 | Park | G06F 1/20 |
| 2022/0377951 | A1 * | 11/2022 | Wang | C07D 243/36 |
| 2023/0046091 | A1 | 2/2023 | Choi et al. | |
| 2023/0253388 | A1 | 8/2023 | Chung et al. | |
| 2023/0413416 | A1 * | 12/2023 | Edmonds | H05K 1/0203 |
| 2025/0027641 | A1 * | 1/2025 | Spiro | F21V 21/005 |

FOREIGN PATENT DOCUMENTS

| | | |
|---|---|---|
| KR | 10-2022-0072535 A | 6/2022 |
| KR | 10-2023-0024469 A | 2/2023 |

* cited by examiner

*Primary Examiner* — Anthony Q Edwards
(74) *Attorney, Agent, or Firm* — Fenwick & West LLP

(57) ABSTRACT

A display device is disclosed. The display device includes a plurality of display modules; a frame that is fastened to the plurality of display modules; a support member fastened to at least one of the frame or the plurality of display modules; and a heat sink fastened to the support member. The heat sink is configured to cover the cover shield and is at least partially in contact with the cover shield.

29 Claims, 32 Drawing Sheets

DISPLAY DEVICE

CROSS-REFERENCE TO RELATED APPLICATION

This application claims priority to and the benefit of Republic of Korea Patent Application No. 10-2023-0056243, filed on Apr. 28, 2023, which is incorporated by reference in its entirety.

BACKGROUND

1. Field

The present disclosure relates to a display device.

2. Discussion of Related Art

Organic light emitting display devices reproduce images by emitting light using an organic light emitting diode (OLED) placed in each pixel according to an input image signal. The organic light emitting display devices have a fast response speed and high luminous efficiency, luminance, and viewing angle, and have an excellent contrast ratio and color reproducibility as it can express black grayscales in full black. No backlight unit is required for these organic light emitting display devices.

In recent years, the display devices that use a light emitting diode (LED), which is an inorganic light-emitting device, as the light-emitting element of pixels have attracted attention as the next generation of the display devices. Because the LEDs are made of inorganic materials, they don't require a separate encapsulation layer to protect the organic material from moisture, and they have an excellent reliability and a longer life than the OLEDs. The LEDs also have a fast light-up speed, excellent luminous efficiency, and are resistant to impact.

When the temperature distribution of a display panel is uneven during operation of a display device, the image quality of the image reproduced on the display panel may be degraded due to electronic elements with temperature characteristics. For example, if the difference between the maximum temperature and the minimum temperature of the display panel is large, this may cause a difference in color in which certain colors appear stronger in the image displayed on the display panel.

SUMMARY

An object to be solved by the present disclosure is to provide a display device that is capable of reducing the maximum temperature of a printed circuit board (hereinafter referred to as "PCB") that affects the temperature of a display panel and reducing the temperature difference in the display panel.

The objects of the present disclosure are not limited to the above-mentioned objects, and other objects, which are not mentioned herein, will obviously be understood by those skilled in the art from the following description.

In one embodiment, a display device comprises: a display panel; a cover bottom that covers a rear surface of the display panel, the cover bottom including an opening that exposes a portion of the display panel; a plate bottom in the opening; a printed circuit board electrically connected to the display panel and in the opening on the rear surface of the display panel; a cover shield that covers the printed circuit board; a support member fastened to at least one of the cover bottom, the plate bottom, the printed circuit board, or the cover shield, the support member including an upper end; and a heat sink including a hollow portion and the upper end of the support member is in the hollow portion, wherein the heat sink covers the cover shield and is at least partially in contact with the cover shield.

In one embodiment, a display device comprises: a plurality of display modules; a frame that is fastened to the plurality of display modules; a support member fastened to at least one of the frame or the plurality of display modules; and a heat sink fastened to the support member, wherein each of the plurality of display modules includes: a display panel; a printed circuit board on a rear surface of the display panel; and a cover shield that covers the printed circuit board, wherein the heat sink covers the cover shield and is at least partially in contact with the cover shield.

In one embodiment, a display device comprises: a display panel; a printed circuit board electrically connected to the display panel, the printed circuit board over a rear surface of the display panel; and a heat sink that overlaps the printed circuit board such that the printed circuit board is between the display panel and the heat sink, the heat sink including a hollow portion across a length of the heat sink.

It is to be understood that both the foregoing general description and the following detailed description are exemplary and explanatory and are intended to provide further explanation of the inventive concepts as claimed.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

The advantages and features of the present disclosure and methods for accomplishing the same will be more clearly understood from embodiments described below with reference to the accompanying drawings. However, the present disclosure is not limited to the following embodiments, but may be implemented in various different forms; rather, the present embodiments will make the disclosure of the present disclosure complete and allow those skilled in the art to fully comprehend the scope of the present disclosure.

In describing the present disclosure, detailed descriptions of known related technologies may be omitted so as not to unnecessarily obscure the subject matter of the present disclosure.

The terms such as "comprising", "including", and "having" used herein are generally intended to allow other components to be added unless the terms are used with the term "only". References to the singular shall be construed to include the plural unless expressly stated otherwise.

When describing a positional or interconnected relationship between two components, such as "on top of", "above", "below", "next to", "connect or couple with", "crossing", "intersecting" etc., one or more other components may be interposed between them unless "immediately" or "directly" is used.

When describing a temporal contextual relationship is described, such as "after", "following", "next to" or "before", it may not be continuous on a time scale unless "immediately" or "directly" is used.

The terms "first", "second" and the like may be used to distinguish components from each other, but the functions or structures of the components are not limited by ordinal numbers or component names in front of the components.

The following embodiments may be combined or associated with each other in whole or in part, and various types of interlocking and driving are technically possible. The embodiments may be implemented independently of each other or together in an interrelated relationship.

Terms used in the embodiments of the disclosure (including technical and scientific terms) are to be construed as they would be commonly understood by one of ordinary skill in the art to which the invention belongs, unless otherwise specifically defined and described, and commonly used terms, such as dictionary defined terms, are to be construed in light of their contextual meaning in the relevant art.

Hereinafter, preferred embodiments of the present disclosure will be described in detail with reference to the accompanying drawings.

Figure 1:
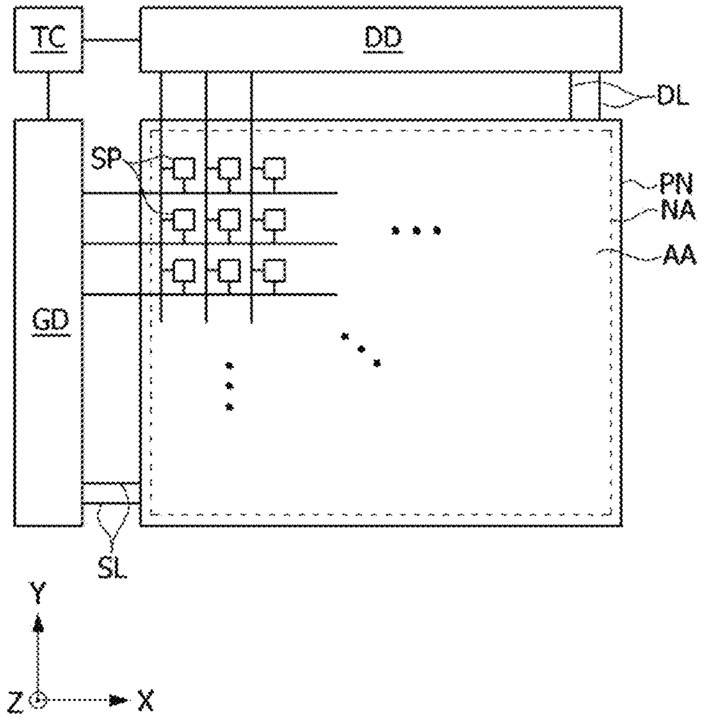
FIG. 1 is a block diagram showing a configuration of a display device according to one embodiment of the present disclosure.

Referring to FIG. 1, a display device includes a display panel PN having a plurality of pixels disposed in a display area AA, and a display panel driving circuit to drive the pixels. The display panel PN may be a panel having a rectangular structure with a length in the X-axis direction, a width in the Y-axis direction, and a thickness in the Z-axis direction. The pixels include a plurality of sub-pixels SP with different colors. The display area AA on which an input image is displayed on the display panel PN may be a screen visible from the front surface of the display panel PN.

The display panel driving circuit includes a data driver DD, a gate driver GD, and a timing controller TC that controls the gate driver GD and the data driver DD.

The input image is displayed on the sub-pixels SP disposed in the display area AA of the display panel PN. Each of the subpixels SP includes a light emitting element and the pixel circuit that drives the light emitting element. The light emitting element may be a light emitting diode (LED) or a micro light emitting diode (micro LED).

On the display panel PN, a plurality of scan lines SL and a plurality of data lines DL are arranged to cross each other. Each of the subpixels SP is connected to a scan line SL and a data line DL. Power supply lines omitted in FIG. 1 may be connected to each of the subpixels SP. In a display panel PN, a non-display area NA may be disposed outside the display area AA.

Figure 5:
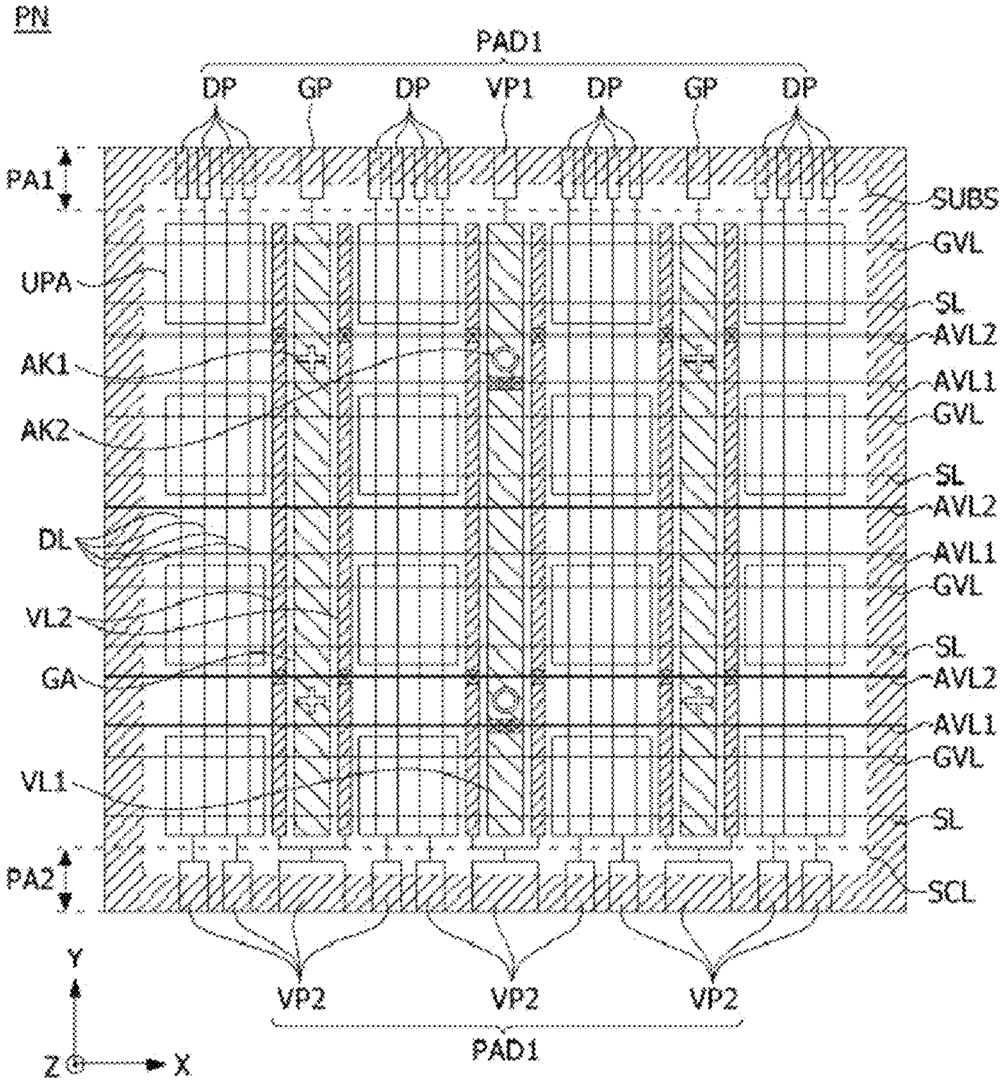
FIG. 5 is a plan view schematically showing a planar structure of a display panel according to one embodiment of the present disclosure.

The gate driver GD supplies scan signals to the scan lines SL in response to a gate control signal provided by the timing controller TC. The gate driver GD may be disposed at least in the non-display area NA of the display panel PN, as shown in FIG. 1, or in the display area AA, as shown in FIG. 5.

The data driver DD converts the image data received from the timing controller TC into a gamma compensated voltage in response to a data control signal provided by the timing controller TC and outputs a data voltage. The data voltage output from the data driver DD is supplied to the data lines DL.

The timing controller TC aligns image data input from the outside and supplies the aligned image data to the data driver DD. The timing controller TC may generate gate control signals and data control signals based on timing signals synchronized with input image signals, for example, dot clock signals, data enable signals, and horizontal/vertical synchronization signals. The timing controller TC supplies the gate control signals to the gate driver GD and the data control signals to the data driver DD to control the timing of the operation of the gate driver GD and data driver DD.

The non-display area NA may have link lines and pad electrodes disposed therein to transmit signals to the subpixels SP in the display area AA. Furthermore, one or more of a gate driver IC in which circuits for the gate driver GD are integrated and a data driver IC in which circuits for the data driver DD are integrated may be disposed in the non-display area NA. The non-display area NA may include the rear surface of the display panel PN, i.e., the rear surface without subpixels SP. The non-display area NA may be minimized so that it is not visible when the image is displayed on the display panel PN.

The display panel driving circuit may be connected to the display panel PN in a variety of ways. For example, the gate driver GD may be disposed in a gate in panel (GIP) fashion in the non-display area NA, or in a gate in active area (GIA) fashion between subpixels SP in the display area AA. For example, the data driver DD and the timing controller TC may be formed on separate flexible films and PCBs, and the data driver DD and the timing controller TC may be electrically connected to the display panel PN by bonding the terminals of the flexible films to pad electrodes formed on the non-display area NA of the display panel PN. The flexible film bonded to the display panel PN may be connected to a PCB on which the circuit elements are mounted and the lines are formed.

Figure 2:
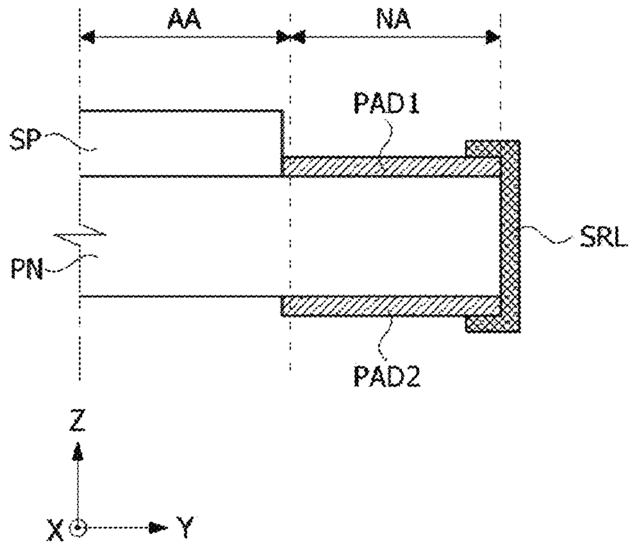
FIG. 2 is a partial cross-sectional view showing pads and a side wiring disposed on the outer periphery of a display panel according to one embodiment of the present disclosure.

A side wiring for connecting the signal line on the front surface of the display panel PN to the pad electrodes in the rear surface of the display panel PN may be formed on the side surface of the outer periphery of the display panel PN. Such a method of electrical connection between the front surface and the rear surface of the display panel PN via the side wiring may be used to maximally minimize the non-display area NA visible on the front surface of the display panel PN. In FIG. 2, “SRL” denotes this side wiring. When the gate driver GD, the data driver DD, and the timing controller TC are electrically connected to the display panel PN in the above manner, a screen without a bezel may be substantially realized on the display panel PN.

Referring to FIG. 2, a plurality of pad electrodes are disposed in the non-display area NA of the display panel PN to transmit various signals to the subpixels SP. For example, a first pad electrode PAD1, which transmits signals to the subpixels SP, may be disposed in the non-display area NA located at the front surface (e.g., a first surface) of the display panel PN. A second pad electrode PAD2, which is electrically connected to circuit components such as the flexible film and the PCB, is disposed in the non-display area NA at the rear surface (e.g., a second surface) of the display panel PN. Only the pad area in which the first pad electrode PAD1 is located is arranged in the non-display area NA located at the front outer periphery of the display panel PN in which an image is displayed, thereby reducing the size of the non-display area.

Various signal lines connected to the subpixels SP, such as the scan line SL or the data line DL, may extend into the non-display area NA and be electrically connected to the first pad electrode PAD1.

The display panel PN may include the side wiring SRL which is disposed on the side surface of the outer periphery of the display panel PN. The side wiring SRL may electrically connect the first pad electrode PAD1 disposed on the front outer periphery of the display panel PN and the second pad electrode PAD2 disposed on the rear outer periphery of the display panel PN while traversing the side surface of the display panel PN. The signals output from the circuit components disposed at the rear surface of the display panel PN may be transmitted to the subpixels SP and the gate driver GD within the display area AA via the second pad electrode PAD2, the side wiring SRL, and the first pad electrode PAD1. Accordingly, a signal transmission path traversing the front, side, and rear surfaces may be formed at the outer periphery of the display panel PN, thereby minimizing the area of the non-display area NA on the front surface of the display panel PN.

Multiple display modules may be combined on one plane to implement a wide-screen tiled display device. Each of the display modules may be implemented as a single display device, and a combination of multiple display modules may be implemented as a wide-screen tiled display device. Each of the display modules includes a single sheet of a display panel PN, a driving circuit of the display panel PN, and cover members of the circuit components and modules coupled to the rear surface of the display panel PN.

Figure 3:
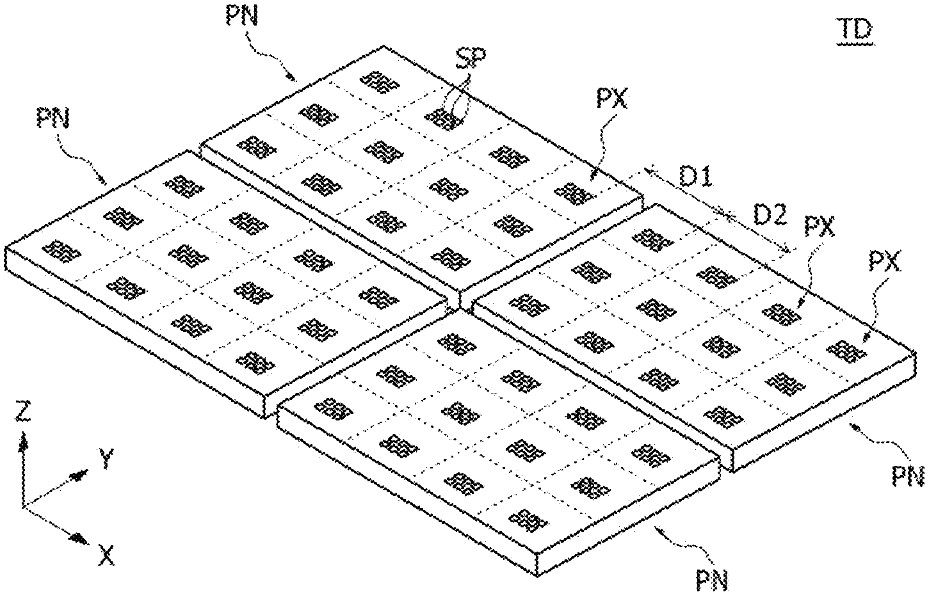
FIG. 3 is a perspective view showing a tiled display device according to one embodiment of the present disclosure.

Referring to FIG. 3, a wide-screen tiled display device TD includes a plurality of display modules disposed on an X-Y plane. Each of the display modules includes a display panel PN on which an input image is reproduced. When the non-display area NA at the front outer periphery of each display panel PN is reduced, the wide-screen image may be reproduced with no visible seams between adjacent display panels PN.

The display panels PN may be assembled on a plane such that the spacing D1 between the outermost pixel PX of one display panel PN and the outermost pixel PX of another display panel PN adjacent to that display panel PN is substantially the same as the spacing D2 between adjacent pixels PX within the display area AA of the display panel PN. As a result, the spacing D1, D2 between the adjacent pixels PX is the same throughout the wide screen display area of the tiled display device TD, and thus the seam area is not visible.

In the tiled display device TD, multiple display modules may share one timing controller TC. A host system may be connected to a plurality of timing controllers TC, may transmit to the timing controllers TC image signals to be reproduced on all of the display panels PN implementing the large-screen of the tiled display device TD, and may synchronize the timing controllers TC.

Figure 4:
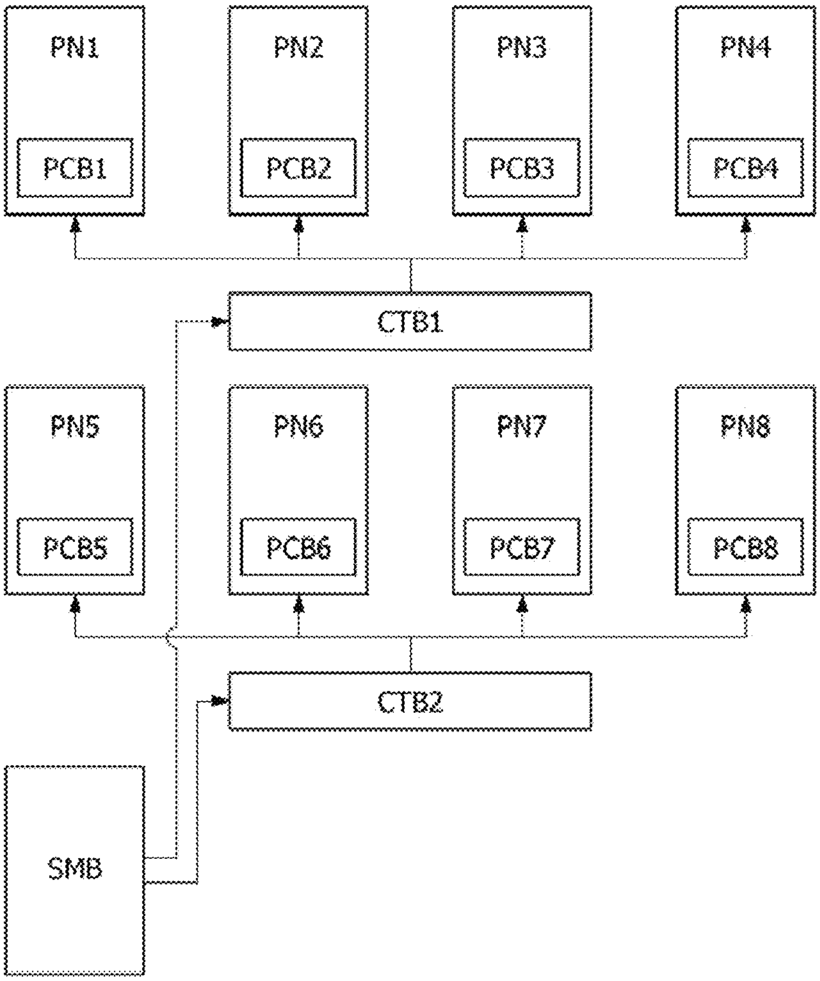
FIG. 4 is a block diagram schematically showing control boards connected to a plurality of printed circuit boards and a system board connected to the control boards.

Referring to FIG. 4, each of the display modules may include a single sheet of a display panel PN and one PCB. A system board SMB is connected to M (M is an integer greater than or equal to 2) control boards (for example, it includes a first control board CTB1 and a second control board CTB2, but not limited thereto). Each of the control boards (for example, it includes a first control board CTB1 and a second control board CTB2, but not limited thereto) is connected to N (N is an integer greater than M) PCBs.

A first control board CTB1 may be connected to the PCBs of a first to fourth display modules PCB1 through PCB4 via flexible films or cables. A second control board CTB2 may be connected to the PCBs of a fifth to eighth display modules PCB5 through PCB8 via flexible films or cables. The system board SMB may be connected to the first and second control boards CTB1, CTB2 via flexible films or cables.

The system board SMB may be a main board of the host system. The system board SMB includes a user interface port to receive user input, an external interface port connected to external devices, a communication module to perform or support various communication protocols, a processor to process multi-media signals, a central processing unit (CPU), and a main power supply. The system board SMB sends an input image signal and a timing signal to the first and second control boards CTB1, CTB2. The timing controllers TC mounted on the first and second control boards CTB1, CTB2 transmits the received image signal to the data driver DD and controls the data driver DD and the gate driver GD based on the timing signal. The driving circuits (for example, the data driver DD and the gate driver GD) for the N display modules write image data to the corresponding display panels PN under the control of one timing controller TC.

FIG. 5 is a plan view schematically showing a planar structure of a display panel according to one embodiment of the present disclosure.

Referring to FIG. 5, a display panel PN includes a substrate SUBS on which a pixel array and a circuit for a gate driver GD are disposed.

Figure 6:
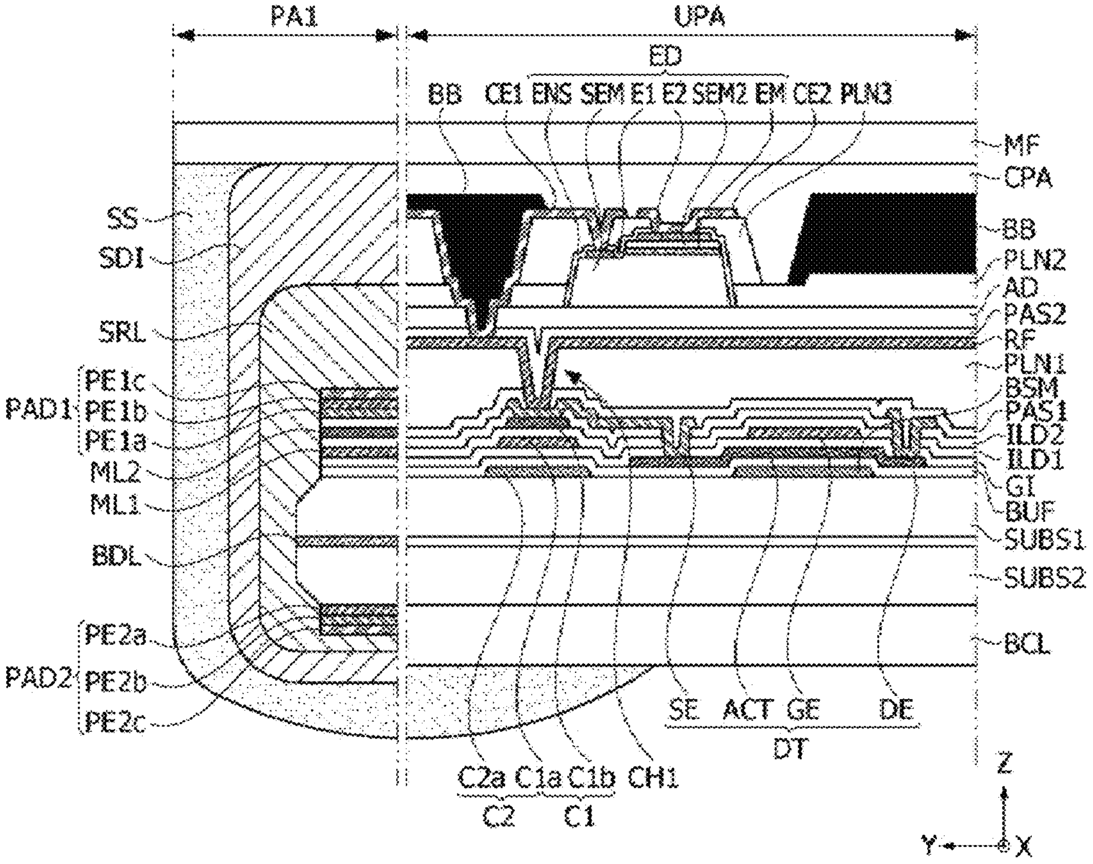
FIG. 6 is a cross-sectional view showing in detail a cross-sectional structure of a display panel according to one embodiment of the present disclosure.

The substrate SUBS may be an insulating substrate that supports components disposed on the upper portion of a display device. The substrate SUBS may have a stacked structure of first and second substrates SUBS1, SUBS2, as shown in FIG. 6. Each of the first and second substrates SUBS1, SUBS2 may be fabricated as a glass, polymer resin, or plastic substrate. Each of the first and second substrates SUBS1, SUBS2 may be made as a flexible substrate that has flexibility, but is not limited thereto.

On one surface (or a front surface) of the substrate SUBS, a display area AA may include a plurality of pixel areas UPA, a plurality of gate driving areas GA, and a plurality of pad areas (for example, it includes a first pad area PA1 and a second pad area PA2, but not limited thereto). One or more pixels PX may be disposed in each of the pixel areas UPA. The pixel areas UPA may be arranged along a plurality of row lines and a plurality of column lines. Each of the pixels PX include a plurality of subpixels SP with different colors. Each of the subpixels SP may emit light independently, including light emitting elements and pixel circuit. The subpixels SP may include, but are not limited to, red subpixels, blue subpixels, and green subpixels.

The plurality of gate driving areas GA includes circuits for gate drivers GD. The gate driving areas GA may be formed along a row direction and/or a column direction between the plurality of pixel areas UPA. A gate driver GD formed in a gate driving area GA may provide a scan signal to a plurality of scan wrings SL.

A first pad area PA1 includes a plurality of first pad electrode PAD1 disposed on the front outermost portion of one side (or an upper side) of the display panel PN. The first pad electrodes PAD1 may transmit various signals to various wirings extending in the column direction from the display area AA. The first pad electrodes PAD1 include data pads DP connected to the data line DL to transmit the data voltage from the data driver DD to the data line DL, and gate pads GP connected to the gate driver GD to transmit clock signals, start signals, gate low voltage, gate high voltage, etc. to the gate driver GD for driving the gate driver GD. The clock signals, start signals, gate low voltages, gate high voltages, etc. for driving the gate driver GD may be generated from the timing controller TC and applied to the gate pads GP through a level shifter and a PCB. The first pad electrodes PAD1 may include a plurality of power supply lines to which a direct current voltage (or a constant voltage) is applied.

The first substrate SUBS1 of the display panel PN includes gate driving lines connected to the gate pads GP in the column direction and a plurality of gate driving lines GVL extending in the row direction. The gate driving lines in the column direction and the gate driving lines GVL in the row direction may be connected through contact holes penetrating the insulating film. The gate driving lines GVL transmit signals necessary to drive the gate drivers GD distributed and disposed in the gate driving area GA, such as clock signals, start signals, gate high voltages, gate low voltages, etc. to the circuits of the gate drives GD.

A second pad area PA2 includes a plurality of first pad electrodes PAD1 disposed on the front outer periphery of the other side (or lower side) of the display panel PN. The second pad area PA2 may include a plurality of low-potential power supply pads VP2.

A DC voltage to be applied to the power supply lines may be output from a power supply circuit omitted in the drawings, and may be applied to the pads VP1 and VP2 connected to the power supply lines through the PCB. The power supply circuit may be a DC-DC converter disposed on PCBs or control boards CTB1, CTB2 arranged on the rear surface of the display panel PN to convert a DC input voltage from a main power source to a DC voltage suitable for driving the display panel PN.

The power supply pads VP1, VP2 connected to the power supply lines may include a plurality of high-potential power supply pads VP1 disposed on the first pad area PA1 to deliver high-potential power voltages to high-potential power supply lines VL1, and a plurality of low-potential power supply pads VP2 disposed on the second pad area PA2 to deliver low-potential power voltages to low-potential power supply lines VL2.

The data pads DP, which are connected one-to-one to the data lines DL, may have a relatively narrow width, while the power supply pads VP1, VP2 and the gate pads GP may have a relatively wide width. The low-potential power supply pads VP2 may have a wider width compared to the high-potential power supply pads VP1. The widths of the pads DP, GP, VP1, and VP2 are not limited to those shown in FIG. 5.

In order to reduce the outermost non-display area NA of the display panel PN, the pixel array, the lines, and the pads are formed on the front surface of the substrate of the display panel PN, and then the outermost peripheral portion at the outside of a scribing line SCL indicated by a dotted line may be removed to provide the substrate SUBS with a minimized non-display area NA. After the scribing process, the rough edge of the outer periphery of the substrate SUBS may be ground or laser trimmed. This will leave the short pad electrodes PAD1, PAD2 with a reduced size on the front outer periphery of the substrate SUBS.

The data lines DL may extend in the column direction (Y-direction) on the first substrate SUBS and overlap the pixel areas UPA. The data lines DL supply the data voltages to the respective pixel circuits of the subpixels SP. The scan lines SL may extend in the row direction (X-direction) on the substrate SUBS of the display panel PN and overlap the pixel areas UPA and the gate driving areas GA. The scan lines SL may supply the scan signals from the gate driver GD across the pixel areas UPA and the gate driving areas GA to the respective pixel circuits of the subpixels SP.

The high-potential power supply lines VL1 extend in the column direction (Y-direction), and at least one of them is connected in a mesh structure to auxiliary high-potential power supply lines AVL1 extending in the row direction (X-direction). The auxiliary high-potential power supply lines AVL1 are connected to the subpixels SP arranged in the row direction (X-direction). Therefore, the high-potential power supply voltages applied to the high-potential power supply lines VL1 may be delivered to the subpixels SP via the auxiliary high-potential power supply lines AVL1.

The low-potential power supply lines VL2 may extend in the column direction (Y-direction), and at least one of them may be connected in a mesh structure to auxiliary low-potential power supply lines AVL2 extending in the row direction (X-direction). The auxiliary low-potential power supply lines AVL2 are connected to the subpixels SP arranged in the row direction (X-direction). Therefore, the subpixels SP are connected to the auxiliary high-potential power supply lines AVL1 to which the low-potential power supply voltage is applied.

The mesh structure of the power supply lines may allow the resistance of the power supply lines to be reduced, which may improve the voltage drop of the high-potential power supply voltage and the deviation of the power supply voltage within the display area AA.

The substrate SUBS of the display panel PN may have one or more alignment keys AK1, AK2 arranged between the pixel areas UPA. The alignment keys AK1, AK2 may be used for alignment in the manufacturing process of the display panel PN. A first alignment key AK1 may be disposed in the gate driving area GA. The first alignment key AK1 may be used to check the aligned position of each of the light emitting elements. The first alignment key AK1 may be formed in a cross pattern, but is not limited thereto. A second alignment key AK2 may overlap the high-potential power supply line VL1. The high-potential power supply line VL1 may include a hole formed in a position overlapping the second alignment key AK2, so that the second alignment key AK2 and the high-potential power supply line VL1 may be distinguished. The second alignment key AK2 may be used to align the display panel PN with a donor substrate. The donor substrate is an intermediate medium for mounting light emitting elements on the substrate SUBS of the display panel PN. A plurality of light emitting elements fabricated on a semiconductor wafer may be attached to and transferred to the donor substrate, and the light emitting elements attached to the donor substrate may be transferred onto the substrate SUBS. The second alignment key AK2 may be formed in a circular or ring pattern, but is not limited to that.

FIG. 6 is a cross-sectional view showing in detail a cross-sectional structure of the display panel according to one embodiment of the present disclosure.

Referring to FIG. 6, a pixel circuit for driving a light emitting element ED is disposed in each of a plurality of subpixels SP on the first substrate SUBS1. The pixel circuit may include a plurality of thin film transistors and one or more capacitors. In FIG. 6, a driving transistor DT, a first capacitor C1, and a second capacitor C2 are illustrated in the pixel circuit for ease of description, but other circuit elements may also be included.

A pattern of a first metal layer may be disposed on the first substrate SUBS1. The pattern of the first metal layer may include a light shielding layer BSM. The light shielding layer BSM may block light from entering an active layer ACT of the driving transistor DT to minimize leakage current. The light shielding layer BSM may be formed of an opaque conductive material, e.g., a metal such as copper (Cu), aluminum (Al), molybdenum (Mo), nickel (Ni), titanium (Ti), chromium (Cr), an alloy of these metals, or a multilayer of metal layers.

A buffer layer BUF may be disposed on the light shielding layer BSM. The buffer layer BUF may block the penetration of moisture or impurities through the first substrate SUBS1. The buffer layer BUF may be formed of silicon oxide (SiOx), silicon nitride (SiNx), or a multilayer of insulating layers.

The active layer ACT and the driving transistor DT including a gate electrode GE, a source electrode SE a drain electrode DE may be disposed on the buffer layer BUF.

The active layer ACT may be made of a semiconductor material such as, but not limited to, an oxide semiconductor, amorphous silicon, or polysilicon. The gate insulating layer GI electrically isolates the active layer ACT from the gate electrode GE of the driving transistor DT. The gate insulating layer GI may be formed of silicon oxide (SiOx), silicon nitride (SiNx), or a multilayer of insulating layers.

A pattern of a second metal layer may be disposed on the gate insulating layer GI. The pattern of the second metal layer may include the gate electrode GE of the driving transistor DT. The second metal layer may be formed of copper (Cu), aluminum (Al), molybdenum (Mo), nickel (Ni), titanium (Ti), chromium (Cr), or a multilayer of metal layers.

A first interlayer insulating layer ILD1 and a second interlayer insulating layer ILD2 are disposed on the gate electrode GE. The first interlayer insulating layer ILD1 and the second interlayer insulating layer ILD2 have contact holes formed therein for connecting each of the source electrode SE and the drain electrode DE of the driving transistor DT to the active layer ACT. Each of the first interlayer insulating layer ILD1 and the second interlayer insulating layer ILD2 may be formed of silicon oxide (SiOx), silicon nitride (SiNx), or a multilayer of insulation layers.

A pattern of a third metal layer may be disposed on the second interlayer insulating layer ILD2. The pattern of the third metal layer may include the source electrode SE and the drain electrode DE overlapping the active layer ACT and connected to the active layer ACT through the contact holes that penetrate the interlayer insulating layers ILD1, ILD2. The source electrode SE may be connected to the capacitors C1, C2 and the first electrode E1 of the light emitting element ED. The third metal layer may be formed of copper (Cu), aluminum (Al), molybdenum (Mo), nickel (Ni), titanium (Ti), chromium (Cr), or a multilayer of metal layers.

The first capacitor C1 includes a first capacitor electrode C1*a* and a second capacitor electrode C1*b*. The first capacitor electrode C1*a* may be formed as the pattern of the second metal layer disposed on the gate insulating layer GI. The second capacitor electrode C1*b* is formed as the pattern of a fourth metal layer disposed on the first interlayer insulating layer ILD1 and overlaps the first capacitor electrode C1*a* with the first interlayer insulating layer ILD1 interposed therebetween. The second capacitor electrode C1*b* may be connected to the source electrode SE of the driving transistor DT. The fourth metal layer may be formed of copper (Cu), aluminum (Al), molybdenum (Mo), nickel (Ni), titanium (Ti), chromium (Cr), or a multilayer of metal layers.

The second capacitor C2 includes a third capacitor electrode C2*a* overlapping the first capacitor electrode C1*a* with the insulating layers BUF, GI interposed therebetween. The third capacitor electrode C2*a* may be formed as the pattern of the first metal layer disposed on the first substrate SUBS1. The second capacitor C2 is electrically connected between the source electrode SE of the driving transistor DT and the light emitting element ED to increase the capacitance of the light emitting element ED, which may increase the brightness when the light emitting element ED emits light.

A first passivation layer PAS1 covers the pattern of the third metal layer and the second interlayer insulating layer ILD2. The first passivation layer PAS1 may be formed of silicon oxide (SiOx), silicon nitride (SiNx), or a multilayer of insulating layers.

A first planarization layer PLN1 is disposed on the first passivation layer PAS1. The first planarization layer PLN1 covers the first passivation layer PAS1 to planarize the surface on which the light emitting element is disposed. The first planarization layer PLN1 may be a thick single layer or a multilayer of organic insulating layers made of benzocyclobutene or acryl-based organic material.

A pattern of a fifth metal layer may be disposed on the first planarization layer PLN1. The pattern of the fifth metal layer may include a reflective layer RF. The reflective layer RF may reflect light from the light emitting element ED toward the front surface of the display panel PN to increase light efficiency, and may be used as an electrode to connect the light emitting element ED to the pixel circuit or the power supply lines. The reflective layer RF may be electrically connected to the source electrode SE of the driving transistor DT and the first capacitor C1 via a contact hole CHI penetrating the first planarization layer PLN1 and the first passivation layer PAS1. Further, the reflective layer RF may be electrically connected to a first electrode E1 of the light emitting element ED via a first connection electrode CE1, or may electrically connect a second electrode E2 of the light emitting element ED and the high-potential power supply line VL1. The fifth metal layer may be formed of a transparent electrode material such as silver (Ag), aluminum (Al), molybdenum (Mo), titanium (Ti), indium tin oxide (ITO), or a multilayer of metal layers.

A second passivation layer PAS2 covers the pattern of the fifth metal layer and the first planarization layer PLN1. The second passivation layer PAS2 may be formed of silicon oxide (SiOx), silicon nitride (SiNx), or a multilayer of insulating layers.

An adhesive layer AD may be applied to the second passivation layer PAS2 to fix the light emitting element ED. The adhesive layer AD may be formed of a photocurable resin that can be cured by light. The adhesive layer AD may be formed of, but is not limited to, an acrylic-based material containing a photosensitive agent. The adhesion layer AD may be formed on the front surface of the first substrate SUBS1 except for the pad areas PA1, PA2 in which the first pad electrode PAD1 is to be disposed.

A light emitting element ED of each of the sub-pixels SP may be disposed on the adhesive layer AD. Light emitting elements ED may emit light by current from the driving transistor DT. The light emitting elements ED may include red light emitting elements ED, green light emitting elements ED, and blue light emitting elements ED. The light emitting elements ED may be a light emitting diode (LED) or a micro LED.

Each of the light emitting elements ED includes a first semiconductor pattern SEM1, a light emitting layer EM, a second semiconductor pattern SEM2, the first electrode E1, and the second electrode E2.

The first semiconductor pattern SEM1 is disposed on the adhesive layer AD, and the second semiconductor pattern SEM2 is disposed on the first semiconductor pattern SEM1. The first semiconductor pattern SEM1 and the second semiconductor pattern SEM2 may be formed as semiconductor patterns obtained by doping a semiconductor material with n-type and p-type impurities. For example, each of the first semiconductor pattern SEM1 and the second semiconductor pattern SEM2 may be a layer in which an n-type or p-type impurities are doped into a material such as gallium nitride (GaN), indium aluminum phosphide (InAlP), gallium arsenide (GaAs), and the like. And, the p-type impurities may be magnesium, zinc (Zn), beryllium (Be), etc., and the n-type impurities may be silicon (Si), germanium, tin (Sn), etc., but are not limited thereto.

The light emitting layer EM is disposed between the first semiconductor pattern SEM1 and the second semiconductor pattern SEM2. The light emitting layer EM may emit light by receiving holes and electrons from the first semiconductor pattern SEM1 and the second semiconductor pattern SEM2. The light emitting layer EM may be made of a single layer or multi-quantum Well (MQW) structure, and may be formed, for example, of indium gallium nitride (InGaN) or gallium nitride (GaN).

The first electrode E1 is disposed on the first semiconductor pattern SEM1. The first electrode E1 electrically connects the driving transistor DT and the first semiconductor pattern SEM1. The first semiconductor pattern SEM1 may be formed as a semiconductor layer doped with n-type impurities. The first electrode E1 may be an anode electrode of the light emitting element ED disposed on the first semiconductor pattern SEM1 and electrically connected to the driving transistor DT and capacitors C1, C2 via the reflective layer RF. The first electrode E1 may be disposed on an upper surface of the first semiconductor pattern SEM1. The first electrode E1 may be formed of a conductive material, for example, a transparent conductive material such as indium tin oxide (ITO) or indium zinc oxide (IZO), or an opaque conductive material such as titanium (Ti), gold (Au), silver (Ag), copper (Cu), or an alloy thereof.

The second electrode E2 is disposed on the second semiconductor pattern SEM2. The second electrode E2 electrically connects the high-potential power supply wiring VL1 and the second semiconductor pattern SEM2. The second semiconductor pattern SEM2 may be formed as a semiconductor layer doped with p-type impurities. The second electrode E2 may be a cathode electrode of the light emitting element ED. The second electrode E2 may be formed of a conductive material, for example, a transparent conductive material such as indium tin oxide (ITO) or indium zinc oxide (IZO), or an opaque conductive material such as titanium (Ti), gold (Au), silver (Ag), copper (Cu), or an alloy thereof.

The light emitting element ED may include a sealing layer ENS. The sealing layer ENS covers the semiconductor patterns SEM1, SEM2 and electrodes E1, E2 to protect the light emitting element ED. The sealing layer ENS and a third planarization layer PLN3 include contact holes exposing the first electrode E1 and the second electrode E2. The first connection electrode CE1 is connected to the reflective layer RE via a first contact hole penetrating the sealing layer ENS and the third planarization layer PLN3. The second connection electrode CE2 is connected to the second electrode E2 via a second contact hole penetrating the sealing layer ENS and the third planarization layer PLN3. Meanwhile, a portion of a lateral surface of the first semiconductor pattern SEM1 may be exposed without the sealing layer ENS.

The second planarization layer PLN2 and the third planarization layer PLN3 may cover the adhesive layer AD and the light emitting element ED. The second planarization layer PLN2 is in contact with the lateral lower end of the light emitting element ED to fix the light emitting element ED. The third planarization layer PLN3 covers the light emitting element ED over the second planarization layer PLN2. The third planarization layer PLN3 includes contact holes exposing the first electrode E1 and second electrode E2 of the light emitting element ED. The second planarization layer PLN2 and the third planarization layer PLN3 may be formed of a single layer or a multilayer of organic insulating materials, for example, photoresists or acryl-based organic materials.

A pattern of a sixth metal layer may be disposed on the third planarization layer PLN3. The sixth metal layer includes the first connection electrode CE1 and the second connection electrode CE2. The first connection electrode CE1 electrically connects the first electrode E1 of the light emitting element ED and the reflective layer RF. The first connection electrode CE1 may be connected to the first electrode E1 of the light emitting element ED via a contact hole penetrating the insulating layers PLN3 and ENS, and may be connected to the reflective layer RF via a contact hole penetrating the insulating layers PAS2, AD, PLN2, and PLN3.

The second connection electrode CE2 is connected to the second electrode E2 of the light emitting element ED via a contact hole penetrating the insulating layers PLN3 and ENS. The second connection electrode CE2 may be connected to the low-potential power supply line VL2.

A bank pattern BB may be disposed on the second planarization layer PLN2. The bank pattern BB may be spaced apart from the light emitting element ED at regular intervals. The bank pattern BB may cover a portion of the first connection electrode CE1 present in a contact hole penetrating the insulating layers PLN2, PLN3. The bank pattern BB may reduce color mixing between subpixels SP by preventing optical crosstalk between subpixels SP. To this end, the bank pattern BB may be formed of black resin, but is not limited thereto.

A first protective layer CPA may cover the patterns CE1, CE2 of the sixth metal layer, the bank pattern BB, and the second planarization layer PLN2 and the third planarization layer PLN3. The first protective layer CPA may be formed of a single layer made of translucent epoxy, silicon oxide (SiOx), or silicon nitride (SiNx), or a multilayer of insulating layers.

Each of the first pad electrodes PAD1 disposed in the pad areas PA1, PA2 of the first substrate SUBS1 may have a multilayer structure of metal layers. For example, each of the first pad electrodes PAD1 may include a first pad metal layer PE1*a*, a second pad metal layer PE1*b*, and a third pad metal layer PE1*c* stacked on the front outermost periphery of the first substrate SUBS1.

The pattern of the third metal layer disposed on the second interlayer insulating layer ILD2 may further include the first pad metal layer PE1*a*. The first pad metal layer PE1*a* may be formed of the same metal as the source electrode SE and drain electrode DE of the driving transistor DT, such as copper (Cu), aluminum (Al), molybdenum (Mo), nickel (Ni), titanium (Ti), chromium (Cr), or a multilayer of metal layers.

The pattern of the fifth metal layer disposed on the first planarization layer PLN1 may further include the second pad metal layer PE1*b*. The second pad metal layer PE1*b* may be formed of the same metal as the reflective layer RF, for example, silver (Ag), aluminum (Al), molybdenum (Mo), or a multilayer of metal layers.

The pattern of the sixth metal layer disposed on the third planarization layer PLN3 may further include the third pad metal layer PE1*c*. The third pad metal layer PE1*c* may be formed of the same conductive material as the first connection electrode CE1 and the second connection electrode CE2, for example, a transparent conductive material such as indium tin oxide (ITO) or indium zinc oxide (IZO), or a multilayer metal layer, etc.

A first metal layer ML1 and a second metal layer ML2 and a plurality of insulating layers may be disposed under the first pad electrodes PAD1. By disposing the first metal layer ML1, the second metal layer ML2, and the plurality of insulating layers under the first pad electrode PAD1, the step difference of the first pad electrodes PAD1 may be adjusted. For example, the buffer layer BUF, the gate insulating layer GI, the first metal layer ML1, the first interlayer insulating layer ILD1, and the second metal layer ML2 may be sequentially disposed between the first pad electrode PAD1 and the first substrate SUBS1. The pattern of the second metal layer disposed on the gate insulating layer GI may include the first metal layer ML1. The pattern of the fourth metal layer disposed on the first interlayer insulating layer ILD1 may include the second metal layer ML2. The plurality of the insulating layers and the metal layers ML2, ML3 under the first pad electrodes PAD1 are not limited to those in FIG. 6.

A second substrate SUBS2 may be disposed on the rear surface of the first substrate SUBS1. A bonding layer BDL is disposed between the first substrate SUBS1 and the second substrate SUBS2. The bonding layer BDL is cured by different curing methods to bond the first substrate SUBS1 and the second substrate SUBS2. The bonding layer BDL may be disposed in only a portion of the area between the first substrate SUBS1 and the second substrate SUBS2, or it may be disposed in the entire area. The first substrate SUBS1 and the second substrate SUBS may be scribed and ground simultaneously so that the lateral surfaces of the first substrate SUBS1 and the second substrate SUBS do not have a step difference.

A plurality of second pad electrodes PAD2 may be disposed on the rear outermost periphery of the second substrate SUBS2. The second pad electrodes PAD2 are electrically connected to the side lines SRL and the first pad electrode PAD1 to transmit signals from circuit components disposed on the rear surface of the second substrate SUBS2 to the subpixels SP disposed on the upper surface of the first substrate SUBS1.

Each of the second pad electrodes PAD2 may have a multilayer structure of metal layers. For example, each of the second pad electrodes PAD2 may include a first pad metal layer PE2*a*, a second pad metal layer PE2*b*, and a third pad metal layer PE2*c* stacked on the back outermost periphery of the second substrate SUBS2. Each of the first and second pad metal layers PE2*a*, PE2*b* may be formed of copper (Cu), aluminum (Al), molybdenum (Mo), nickel (Ni), titanium (Ti), chromium (Cr), or a multilayer of metal layers. The third pad metal layer PE2*c* may be formed of a transparent conductive material such as indium tin oxide (ITO) or indium zinc oxide (IZO).

A second protective layer BCL may be disposed on the rear surface of the second substrate SUBS2. The second protective layer BCL may cover various lines except for the second pad electrodes PAD2 on the rear surface of the second substrate SUBS2. The second protective layer BCL may be made of an organic insulating material, for example, a benzocyclobutene or acryl-based organic insulating material.

Circuit components such as a plurality of flexible films and PCBs may be disposed on the rear surface of the second substrate SUBS2. The output terminals of the flexible film are electrically connected to the second pad electrode PAD2, and the input terminals of the flexible film are electrically connected to the output terminals of the PCB. Accordingly, a signal or voltage output from the PCB may be transmitted to the subpixels SP disposed on the front surface of the first substrate SUBS1 via the flexible film, the second pad electrode PAD2, the side wiring SRL, the plurality of first pad electrodes PAD1, and the wiring connected to the first pad electrode PAD1.

The side lines SRL electrically connect the first pad electrodes PAD1 and the second pad electrodes PAD2 across the side surfaces of the first substrate SUBS1 and the second substrate SUBS2. The side lines SRL may be formed on the side surface of the substrates SUBS1, SUBS2 by a pad printing method using conductive inks, for example, the conductive inks including silver (Ag), copper (Cu), molybdenum (Mo), and chromium (Cr).

A side insulating layer SDI may cover the side lines SRL formed on the outermost front, side, and rear surfaces of the substrates SUBS1 and SUBS2 bonded together. If the side lines are made of metal, external light may be reflected from the side lines or light emitted by the light emitting element ED may be reflected from the side lines and be visible to the user. In order to improve image deterioration due to such reflected light, the side insulating layer SDI may include a black material that absorbs external light. For example, the side insulating layer SDI may be formed on the outermost periphery of the substrates SUBS1, SUBS2 with black ink that can be applied by a printing method.

A seal SS may cover the side insulating layer SDI to protect the display panel PN from external shock, moisture, oxygen, etc. For example, the seal SS may be made of an insulating material such as polyimide (PI), poly urethane, epoxy, acryl-based insulating material, or the like.

A functional film MF may cover the front surface of the first display panel PN. The functional film MF may be one or more of a variety of functional films, such as an anti-scattering film, an anti-glare film, an anti-reflective film, a low-reflective film, an OLED transmittance controllable film for a luminance enhancement, a color difference compensation film, a polarizing plate, and the like. The anti-scattering film prevents substrate fragments or particles from scattering when the display panel PN is damaged. The functional film MF may be cut and removed together with the outer portion of the seal SS along a cutting line that overlaps with the seal SS after the seal SS is broadly bonded to the front surface of the first substrate SUBS1. As a result, the side surface exposed at the outmost periphery of the functional film MF and the seal SS may form a coplanar side surface without any step.

Hereinafter, the structure of the display module LDM according to an embodiment of the present disclosure will be described with reference to FIGS. 7 to 9.

Figure 7:
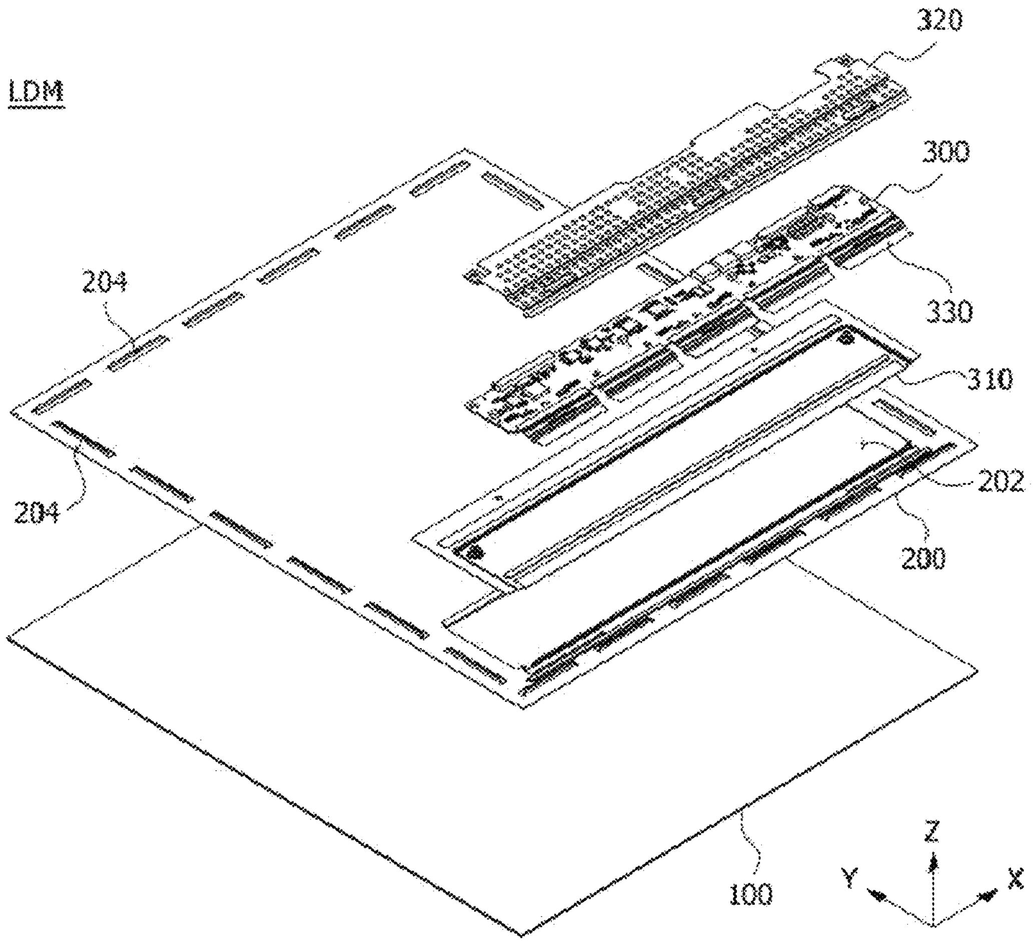
FIG. 7 is an exploded perspective view of a display module according to one embodiment of the present disclosure.

FIG. 7 is an exploded perspective view of a display module LDM according to one embodiment of the present disclosure. FIG. 8 is a rear view of a display device according to one embodiment of the present disclosure. FIG. 9 is a cross-sectional view of the display module LDM taken along line "I-I'" in FIG. 8 according to one embodiment of the present disclosure.

Figure 8:
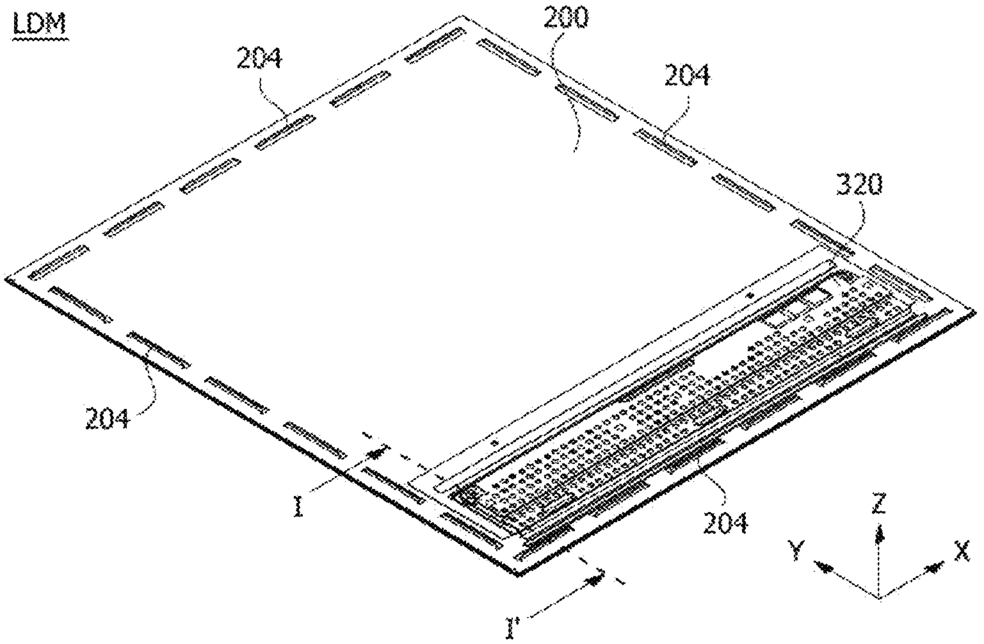
FIG. 8 is a rear view of a display device according to one embodiment of the present disclosure.
Figure 9:
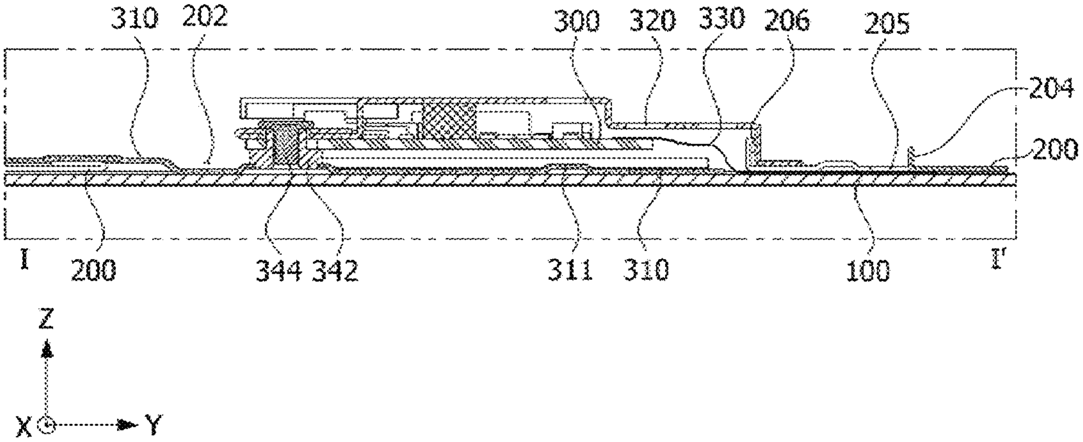
FIG. 9 is a cross-sectional view of the display module taken along line "I-I'" in FIG. 8 according to one embodiment of the present disclosure.

Referring to FIGS. 7 to 9, the display module LDM according to an embodiment of the present disclosure includes a display panel 100, a cover bottom 200, a PCB 300, a plate bottom 310, and a cover shield 320.

A flexible film 330 is bonded to the rear surface of the display panel 100. The flexible film 330 may be electrically connected to the second pad electrode PAD2, which is disposed on the rear outer periphery of the display panel 100.

The PCB 300 is electrically connected to the flexible film 330. IC chips and various circuit elements may be mounted on the PCB 300, and lines for them may be formed. On the rear surface of the display panel 100, the plate bottom 310, the PCB 300, and the cover shield 320 are fixed so as to overlap each other at a distance from each other. For example, as shown in FIG. 9, pem-nuts 342 may be fastened to the plate bottom 310, the PCB 300, and the cover shield 320, and the plate bottom 310, the PCB 300, and the cover shield 320 may be combined into a stacked structure by pem-bolts 344 inserted into the pem-nuts.

A cover bottom 200 is disposed on the rear surface of the display panel 100. The cover bottom 200 may support and protect the display panel 100 on the rear surface of the display panel 100. The cover bottom 200 may have a shape that corresponds to the planar shape of the display panel 100 and may cover the rear surface of the display panel 100. The cover bottom 200 may be made of a material that is rigid and has high thermal conductivity. The cover bottom 200 may be made of a metal such as aluminum (Al), copper (Cu), zinc (Zn), silver (Ag), gold (Au), iron (Fe), steel use stainless (SUS), or Invar, or a polymer synthetic resin such as plastic.

The cover bottom 200 may include an opening 202 in which the plate bottom 310, the PCB 300, and the cover shield 320 are disposed, and a plurality of first protrusions 204 disposed along the edge of the cover bottom 200. The opening 202 may expose a region where the plurality of flexible films 330 are bonded to the display panel 100.

The plate bottom 310 may be disposed within the opening 202 of the cover bottom 200 to support the PCB 300 from below.

The cover bottom 200 may include a second protrusion 206 protruding from an edge of the opening 202 toward the cover shield 320. The second protrusion 206 may protrude from one edge of the opening 202 in a direction perpendicular to the rear surface of the cover bottom 200. As shown in FIG. 9, the second protrusion 206 may be engaged with a protrusion bent at one edge of the cover shield 320 to limit the movement of the cover shield 320 and guide the position of the cover shield 320.

As shown in FIG. 9, the first protrusions 204 of the cover bottom 200 may be bent to expose the openings 205 as shown in FIG. 9. A plurality of first protrusions 204 and openings 205 may be disposed on the top, bottom, and left and right sides of the cover bottom 200 along the outer periphery of the cover bottom 200.

Each of the first protrusions 204 of the cover bottom 200 may be used to couple a plurality of display modules LDM to a cabinet frame not shown in the drawing. Each of the first protrusions 204 may protrude vertically from the rear surface of the cover bottom 200. As shown in FIG. 3, adjacent display modules LDM may be fixed to the cabinet frame in the form of tiles on the same plane by a bonding or fastening method that connects the first protrusions 204 formed on the respective display modules LDM.

The cover bottom 200 may be, but is not limited to, adhered to the rear surface of the display panel 100 using a double-sided adhesive member adhered along the edge of the cover bottom 200.

A heat dissipation sheet, omitted from the drawing, may be disposed between the PCB 300 and the display panel 100. The heat dissipation sheet may be made of a material with high thermal conductivity, such as, but not limited to, one of graphite, aluminum (Al), and copper (Cu). The heat dissipation sheet may cover at least a portion of the plate bottom 310 on the rear surface of the cover bottom 200 and at least a portion of the cover bottom 200. The heat dissipation sheet and the plate bottom 310 may be adhered together using, but are not limited to, an adhesive member such as double-sided tape.

As shown in FIG. 9, the plate bottom 310 may be disposed between the PCB 300 and the display panel 100 so that at least a portion of the plate bottom 310 is in contact with the display panel 100. The plate bottom 310 supports the PCB 300 from below. The plate bottom 310 may distribute and dissipate heat from the PCB 300, and dissipate heat from the display panel 100 by contacting a relatively high temperature region on the display panel 100, thereby reducing the temperature difference in the display panel 100.

The plate bottom 310 may be disposed within the opening 202 of the cover bottom 200, as shown in FIGS. 7 and 9, and may overlap the rear surface of the cover bottom 200 outside of the opening 202.

The plate bottom 310 may include a protrusion 311 that protrudes toward the PCB 300, as shown in FIG. 9. The protrusion 311 protrudes from the plate bottom 310 in the form of a rib to reinforce the rigidity of the plate bottom 310 and support the PCB 300. The protrusion 311 is in direct contact with the PCB 300. Heat from the PCB 300 may be distributed throughout the plate bottom 310 through the protrusion 311.

The cover shield 320 may cover the PCB 300 from above to protect the PCB 300 from external impact. Thus, the PCB 300 is between the cover shield 320 and the plate bottom 310. The cover shield 320 may be made of a material having rigidity. The cover shield 320 includes a plurality of heat dissipation holes. The heat generated in the PCB 300 may be dissipated to the outside through the heat dissipation holes in the cover shield 320. Among the circuit elements mounted on the PCB 300, circuit elements that generate a lot of heat may be exposed to the outside without being covered by the cover shield 320, so that the heat can be efficiently dissipated.

Figure 10:
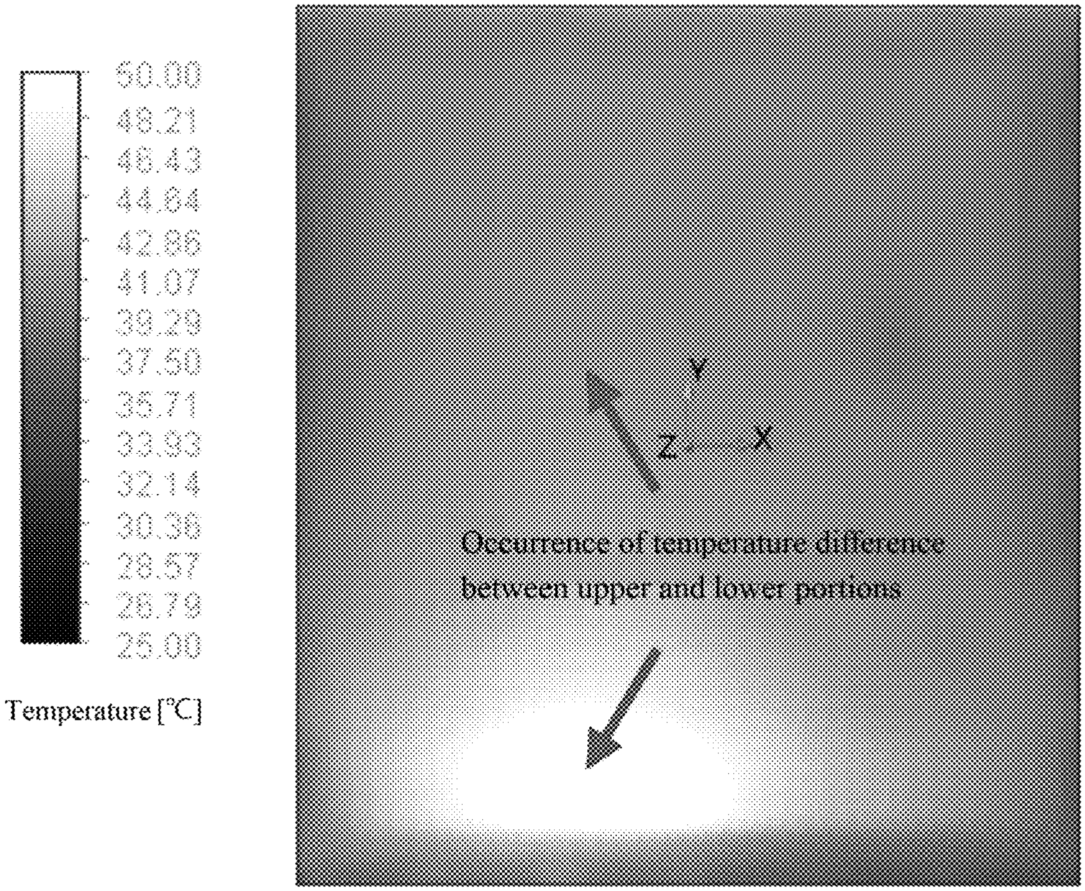
FIG. 10 is a diagram showing an example of a temperature distribution measured at the front surface of a display panel.

FIG. 10 is an example of a temperature distribution measured at the front surface of the display panel 100.

In the display module LDM, the PCB 300 disposed on the rear surface of the display panel 100 may generate heat by a high temperature, and thus the display panel 100 may have an asymmetric temperature distribution as shown in FIG. 10. In this case, the temperature difference between the upper and lower portions of the display panel 100 may increase, and the colors in the image reproduced on the display panel 100 may be visually perceived differently.

Figure 11:
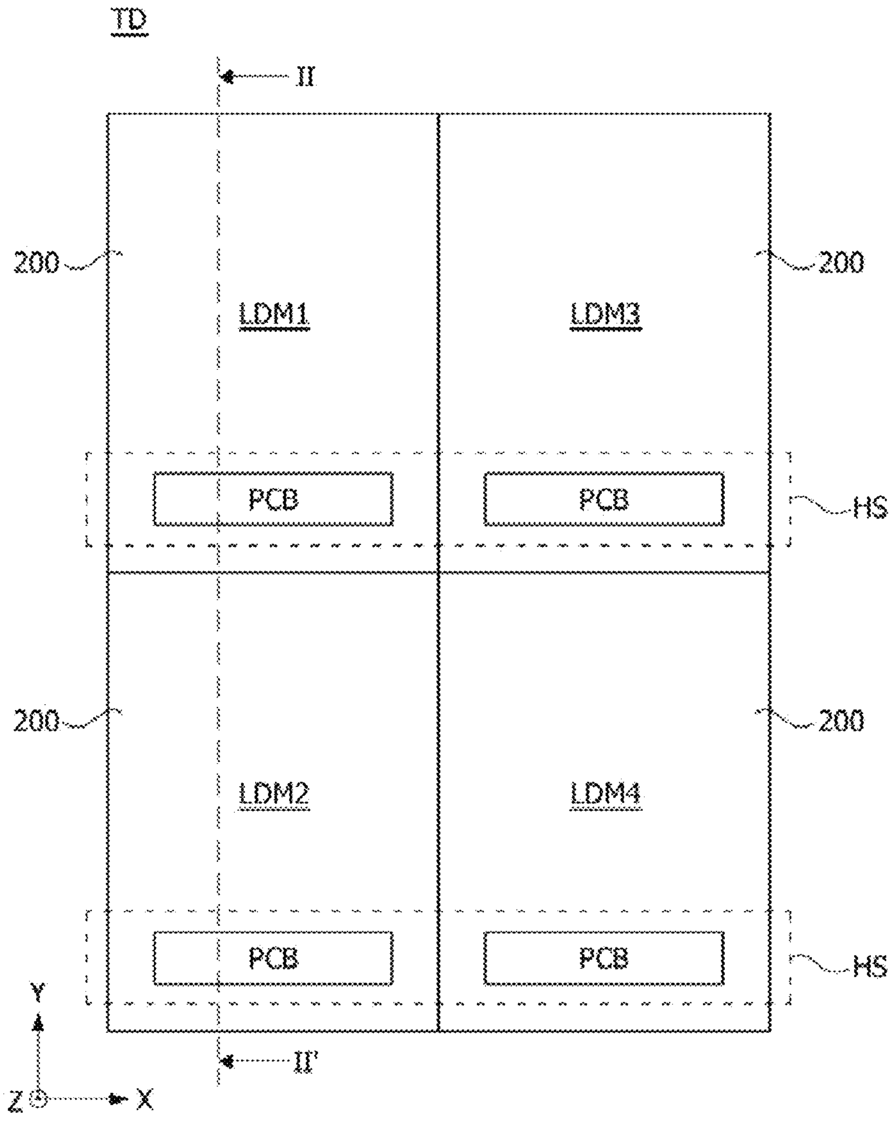
FIG. 11 is a diagram showing an example of a tiled display device in which display modules are arranged in the same direction on the same plane according to one embodiment of the present disclosure.
Figure 12:
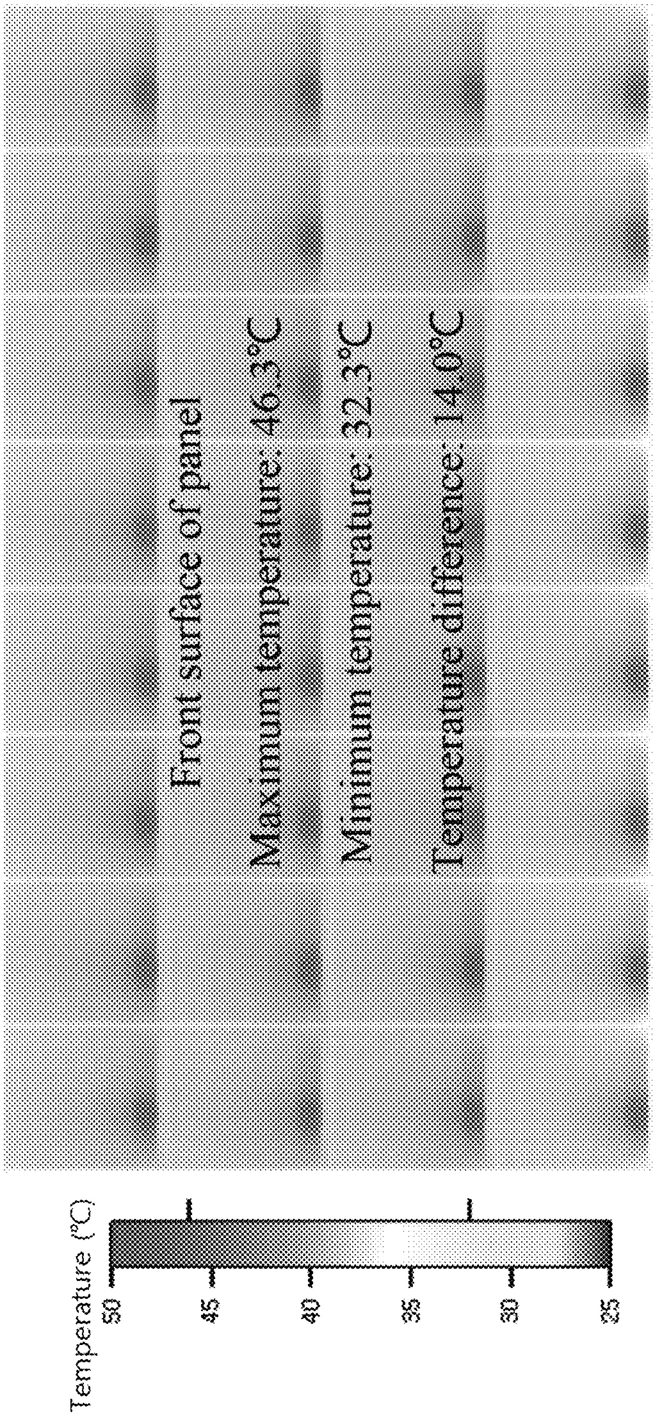
FIG. 12 is a diagram showing a temperature measurement result of a tiled display device including 8*4 display modules arranged in the same manner as in FIG. 11 according to one embodiment of the present disclosure.

FIG. 11 is an example of a tiled display device TD in which display modules LDM1 to LDM4 are arranged in the same direction, for example, in the forward direction, on the same plane. FIG. 12 is a diagram showing a temperature measurement result of a tiled display device TD including 8*4 display modules arranged in the same manner as in FIG. 11. This temperature measurement result is the temperature at the front surface of the display panels 100. In FIG. 12, the maximum temperature is 46.3° C., the minimum temperature is 32.3° C., and the temperature difference therebetween is 14.0° C. At this case, the temperature at the rear surface of the PCB 300 is 77.1° C.

Figure 13:
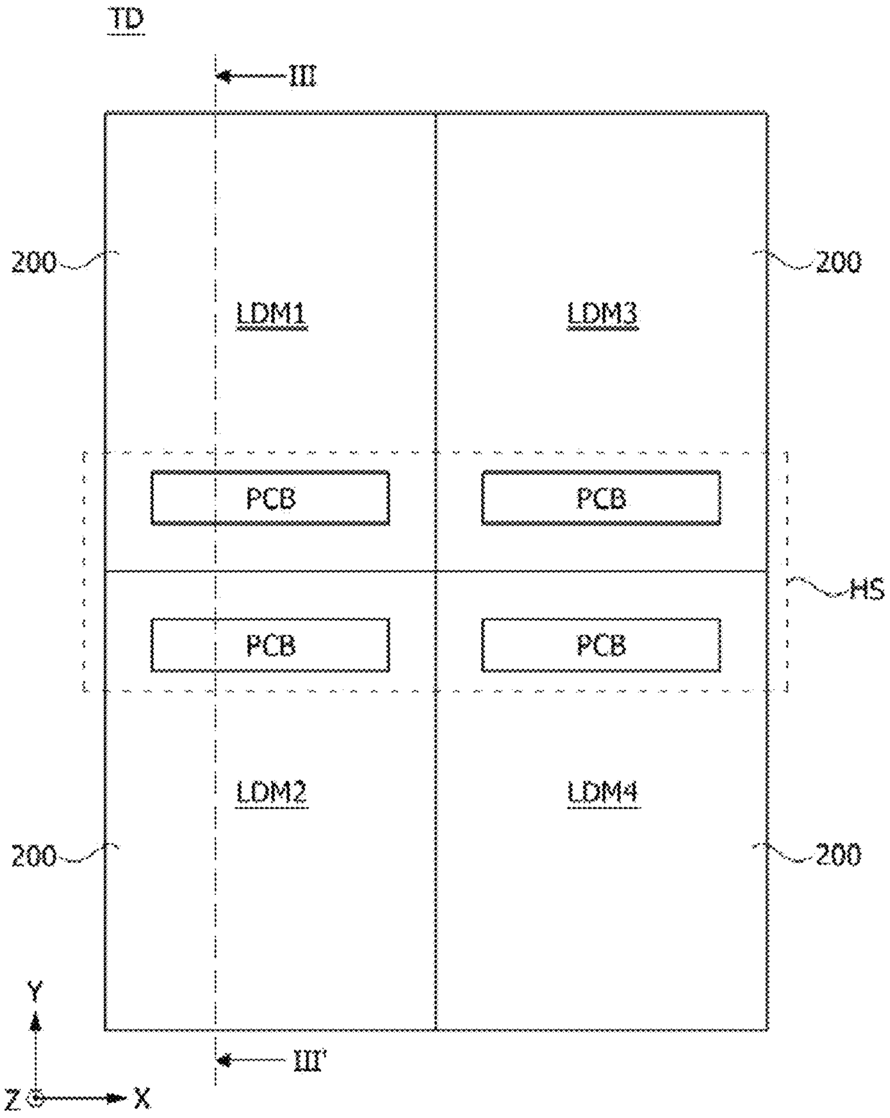
FIG. 13 is a diagram showing an example of a tiled display device in which adjacent display modules are arranged in the reverse direction to each other on the same plane according to one embodiment of the present disclosure.
Figure 14:
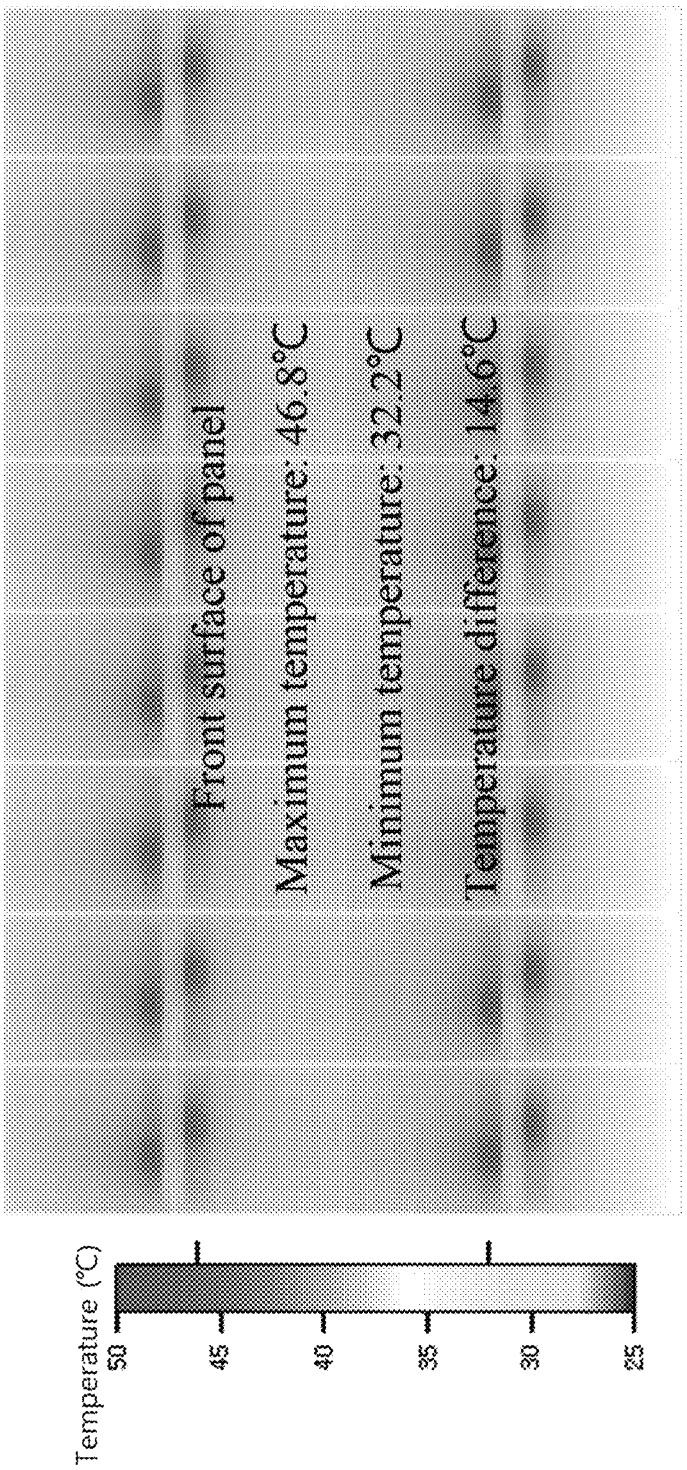
FIG. 14 is a diagram showing a temperature measurement result of a tiled display device including 8*4 display modules arranged in the same manner as in FIG. 13 according to one embodiment of the present disclosure.

In one embodiment, display modules are arranged in a plurality of numbered rows. FIG. 13 is an example of a tiled display device TD in which adjacent display modules LDM1 to LDM4 are arranged in the reverse direction to each other on the same plane. For example, when viewed from the Y-axis direction, odd-numbered display modules LDM1, LDM3 in odd-numbered rows may be arranged in the forward direction (or at 0 degrees), and even-numbered display modules LDM2, LDM4 in even-numbered rows may be reversed and arranged in the opposite direction (or at 180 degrees) such that the printed circuit boards of the odd numbered display modules LDM1 and LDM3 and the printed circuit boards of the even numbered display modules LDM2 and LDM4 are adjacent to each other. In this case, the distance between adjacent PCBs 300 on adjacent display modules in the Y-axis direction is shortened, resulting in a concentration of the hot components in the tiled display device. FIG. 14 is a diagram showing a temperature measurement result of a tiled display device TD including 8*4 display modules arranged in the same manner as in FIG. 13. This temperature measurement result is the temperature at the front surface of the display panels 100. In FIG. 14, the distance between the PCBs 300 was shortened so that the maximum and minimum temperatures were measured to be 46.8° C. and 32.2° C., respectively, and thus the temperature difference was further increased to 14.6° C. In this case, the temperature at the rear surface of the PCB 300 is 76.8° C.

In FIG. 13, one heat sink HS covers the cover shields 320 of the odd-numbered display modules and the cover shields 320 of the even-numbered display modules. One heat sink HS may be in contact with each of the cover shields 320 of odd-numbered display modules and each of the cover shields 320 of the even-numbered display modules.

The tiled display device TD further includes one or more heat sinks HS with a predetermined separation distance therebetween that cover the hot components on the display panel 100, as shown in FIGS. 11 and 13. The heat sink HS overlays the hot components on the display panels 100, such as the PCB 300 and the cover shield 320, and dissipates heat from the PCB 300 transferred through the cover shield 320, thereby lowering the maximum temperature of the display panels 100 and reducing the temperature difference.

The heat sink HS may be coupled to at least one of the display modules LDM1 to LDM4 to cover the cover shield 320, and may be at least partially in contact with the cover shield 320, as shown in FIGS. 11 and 13.

Figure 15:
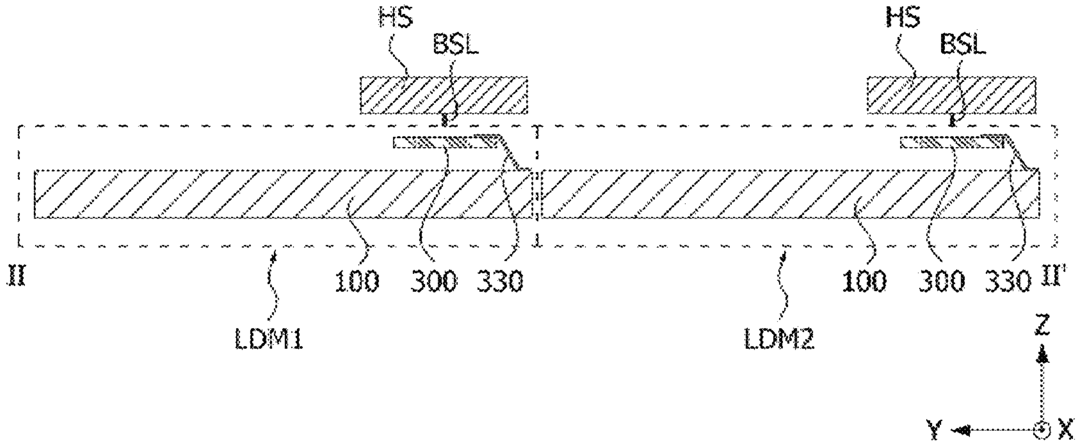
FIGS. 15 to 18 are diagrams schematically showing various heat sinks applicable to the tiled display devices shown in FIGS. 11 to 14 according to one embodiment of the present disclosure.
Figure 16:
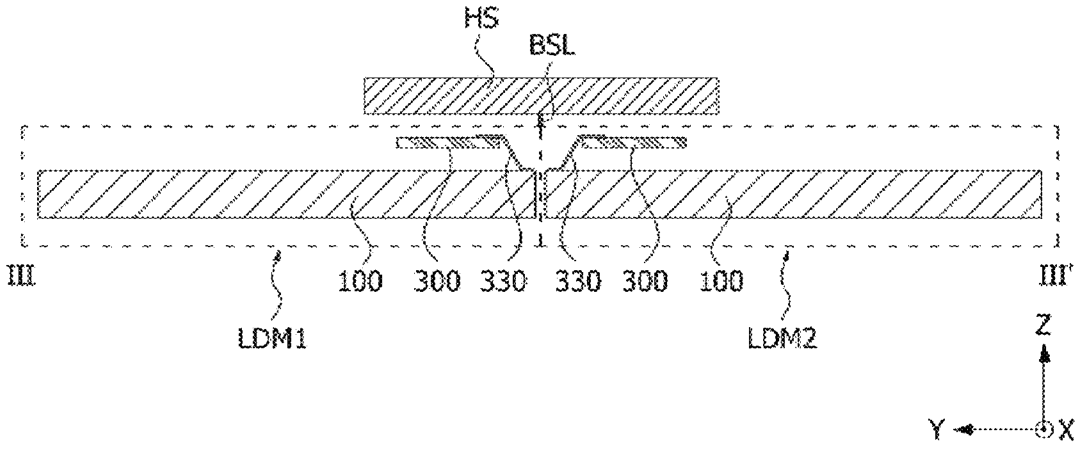
Figure 17:
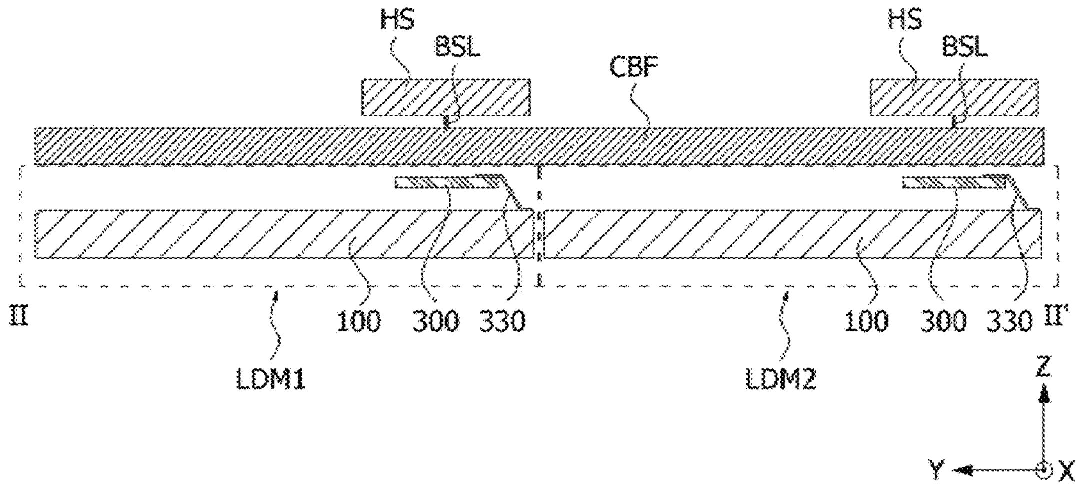
Figure 18:
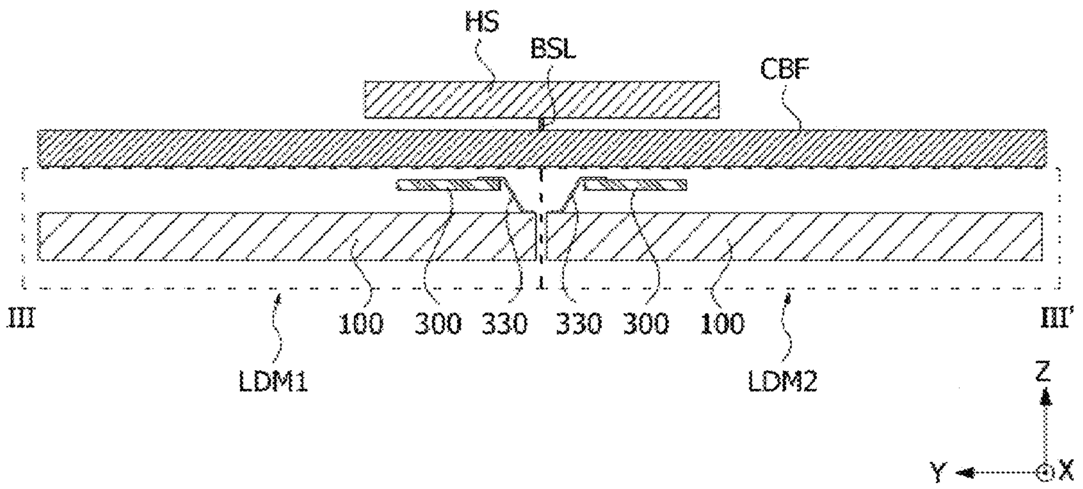

FIGS. 15 to 18 are diagrams schematically showing various heat sinks HS applicable to the tiled display devices TD shown in FIGS. 11 to 14 according to one embodiment of the present disclosure. FIG. 15 is a diagram showing a heat sink HS coupled to the display modules LDM1, LDM2, taken along the line "II-II'" of FIG. 11. FIG. 16 is a diagram showing a heat sink HS coupled to the display modules LDM1, LDM2, taken along the line "III-III'" of FIG. 13 according to one embodiment of the present disclosure. FIG. 17 is a diagram showing a heat sink HS coupled to the cabinet frame CBF, taken along the line "II-II'" of FIG. 11 according to one embodiment of the present disclosure. FIG. 18 is a diagram showing a heat sink HS coupled to the display modules LDM1, LDM2, taken along the line "III-III'" of FIG. 13 according to one embodiment of the present disclosure.

The heat sink HS may be fastened (e.g., connected) to the display module or the frame using a separate support member. Here, the frame is a structure to which the support member may be fastened. The frame may be a cabinet frame to which a plurality of display modules are fastened, but is not limited thereto. For example, the frame may be a separate frame from the cabinet frame. Hereinafter, a cabinet frame will be described as an example of a frame, but is not limited thereto.

Referring to FIGS. 15 and 16, a support member BSL may be coupled to the rear surface of at least one of the display modules LDM1, LDM2. The lower end of the support member BSL may be attached to at least one of the cover bottom 200, the PCB 300, and the plate bottom 310 of the display modules LDM1, LDM2 on the rear surface of the display module using one or more of a bolt and nut fastening method, an adhesive resin bonding method, and a press-fitting method. The heat sink HS may be coupled to the upper end of the support member BSL and may cover the cover shield 320 disposed on the PCB 300. At least a portion of the heat sink HS may be in contact with the cover shield 320 through the support member BSL in the heat dissipation path.

Referring to FIGS. 17 and 18, the support member BSL may be coupled to the cabinet frame CBF to which a plurality of the display modules LDM1, LDM2 are attached. For example, 4*2 display modules may be attached to the cabinet frame CBF, but are not limited to. The cabinet frame CBF may include an outer frame that conforms to the outermost shape of the tiled display device and an inner frame fixed to the outer frame. The internal frame may include one or more horizontal frames and one or more vertical frames.

The support member BSL may be attached to the cabinet frame CBF using one or more of a bolt and nut fastening method, an adhesive resin bonding method, or a press-fitting method. The heat sink HS may be coupled to the support member BSL and cover the cover shield 320 disposed on the PCB 300. The heat sink HS may be connected to the cabinet frame CBF through the support member BSL in the heat dissipation path and may be in contact with the cover shield 320.

The support member BSL may be made of a polymer material or a metal material. The lower end of the support member BSL may be fixed to the display module LDM1, LDM2 or to the cabinet frame, and the upper end of the support member BSL may be movably coupled in the internal space of the heat sink HS, that is, in a hollow. In one embodiment, the support member BSL is made of a material that facilitates mounting the heat sink HS and is capable of pulling the heat sink HS toward the display modules LDM1, LDM2 with a restoring force, such as a material having a large elastic force.

The heat sink HS may be fastened to the support member BSL by sliding it into the support member BSL. The length of the support member BSL may be equal to or shorter than the length of the heat sink HS. In order to reduce the fastening time between the support member BSL and the heat sink HS, a short support member BSL may be attached to the display modules LDM1, LDM2 or the cabinet frame CBF.

In one embodiment, the heat sink HS may be made of a metal material that conducts heat well, but is not limited thereto. For example, a heat sink HS may be fabricated in a structure in which metal beads are mixed into a highly processable polymer material. In this case, the heat transfer of the heat sink HS may be performed well, and the specific heat and rigidity of the heat sink HS may be increased.

Figure 19:
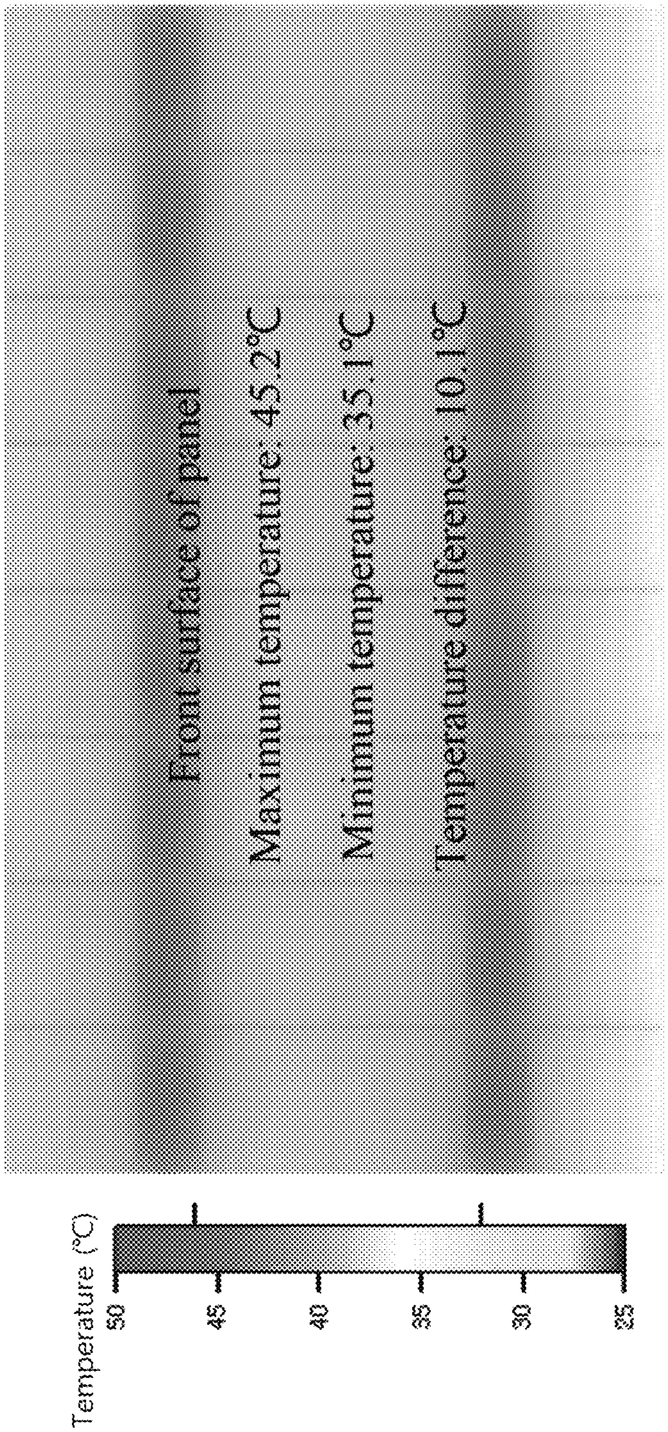
FIG. 19 is a diagram showing a temperature measurement result of a sample in which a heat sink is coupled to the rear surface of a tiled display device including 8*4 display modules arranged in the same manner as in FIG. 18 according to one embodiment of the present disclosure.

FIG. 19 is a diagram showing a temperature measurement result of a sample in which a heat sink HS is coupled to the rear surface of a tiled display device TD including 8*4 display modules arranged in the same manner as in FIG. 18. This temperature measurement result is the temperature at the front surface of the display panels 100. In FIG. 19, the maximum and minimum temperatures were measured at 45.2° C. and 35.1° C., respectively, due to the shortened distance between the PCBs 300 and the heat dissipation effect of the heat sink HS on the components where the high temperature is concentrated, and the temperature difference was thus reduced to 10.1° C. At this case, the temperature at the rear surface of the PCB 300 is lowered to 47.2° C.

Each of the display modules may further include a vibration generator coupled to the rear surface of the display panel 100. The vibration generator may be in direct contact with the rear surface of the display panel 100 and may be covered by the cover bottom 200. The vibration generator may vibrate the display panel 100 in response to an audio signal and output sound from the display panel 100. The vibration generator is disposed between the display panel 100 and the cover bottom 200 and contacts the rear surface of the display panel 100. The vibration generator is connected to a control board or a system board through a separate flexible film to generate vibration according to the audio signal received from a timing controller TC or a host system. The vibration of the vibration generator may be transmitted to the display panel 100, and the vibration generator may act as a diaphragm of the speaker in the display panel 100 so that sound may be output from the display panel 100.

Figure 20:
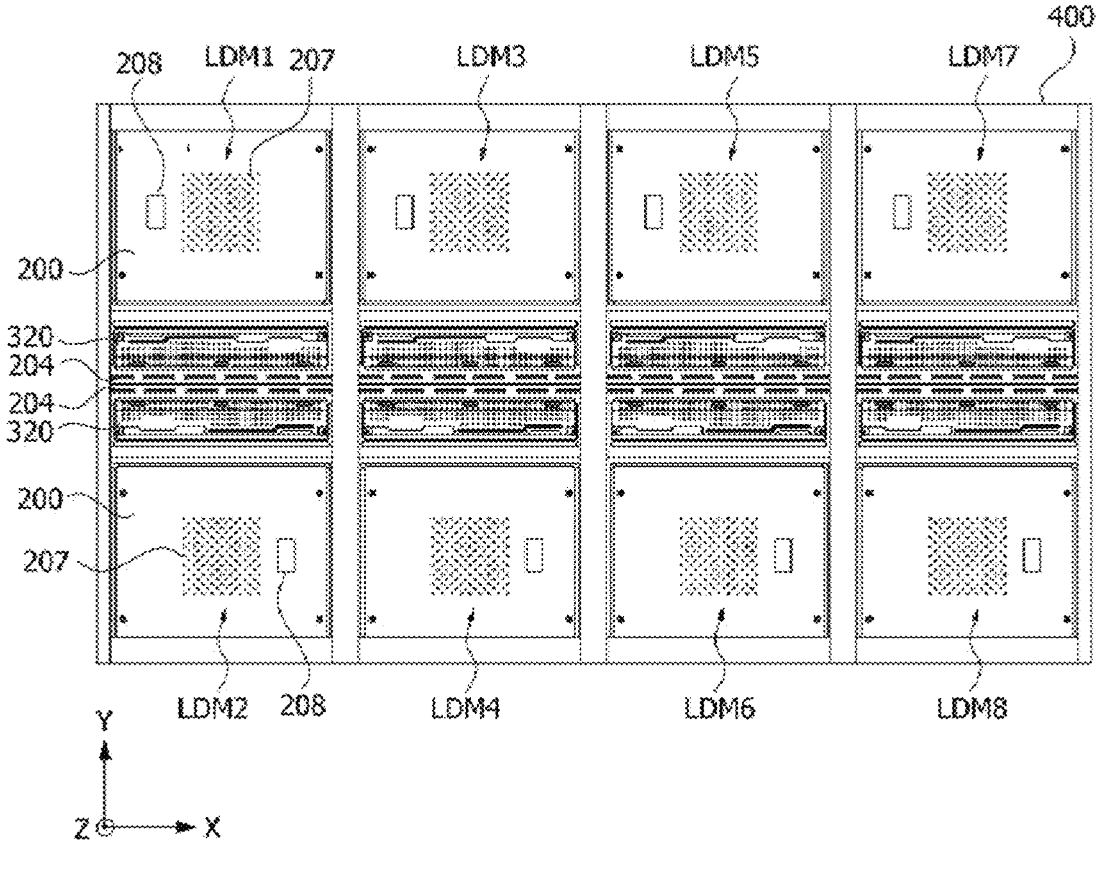
FIG. 20 is a diagram showing the rear surface of a tiled display device including 4*2 display modules without a heat sink coupled thereto, arranged in the same manner as in FIG. 18 according to one embodiment of the present disclosure.

FIG. 20 is a plan view showing the rear surface of a tiled display device TD including 4*2 display modules LDM1 to LDM8 disposed in the same manner as in FIG. 18, without a heat sink, on the rear surface of the tiled display device TD.

Referring to FIG. 20, the display modules LDM1 to LDM8 may be mounted on a cabinet frame 400, which results in each screen being expanded in total to a coplanar widescreen display. The first protrusions 204 of each of the adjacent display modules may be covered with thermosetting or photocurably polymer resin. The adjacent display modules may be firmly bonded together by the cured polymer resin.

Each of the display modules LDM1 to LDM8 may further include a plurality of vent holes 207 and an opening 208 disposed in the cover bottom 200, as shown in FIG. 20. The vent holes 207 may prevent the cover bottom 200 from vibrating abnormally due to sound pressure when the display panel 100 is vibrated by the vibration generator. The vibration generator in contact with the rear surface of the display panel 100 needs to be electrically connected to the control board or the system board. To this end, a separate flexible film on which lines are formed electrically connects the vibration generator to the control board or the system board through the opening 208.

Figure 21:
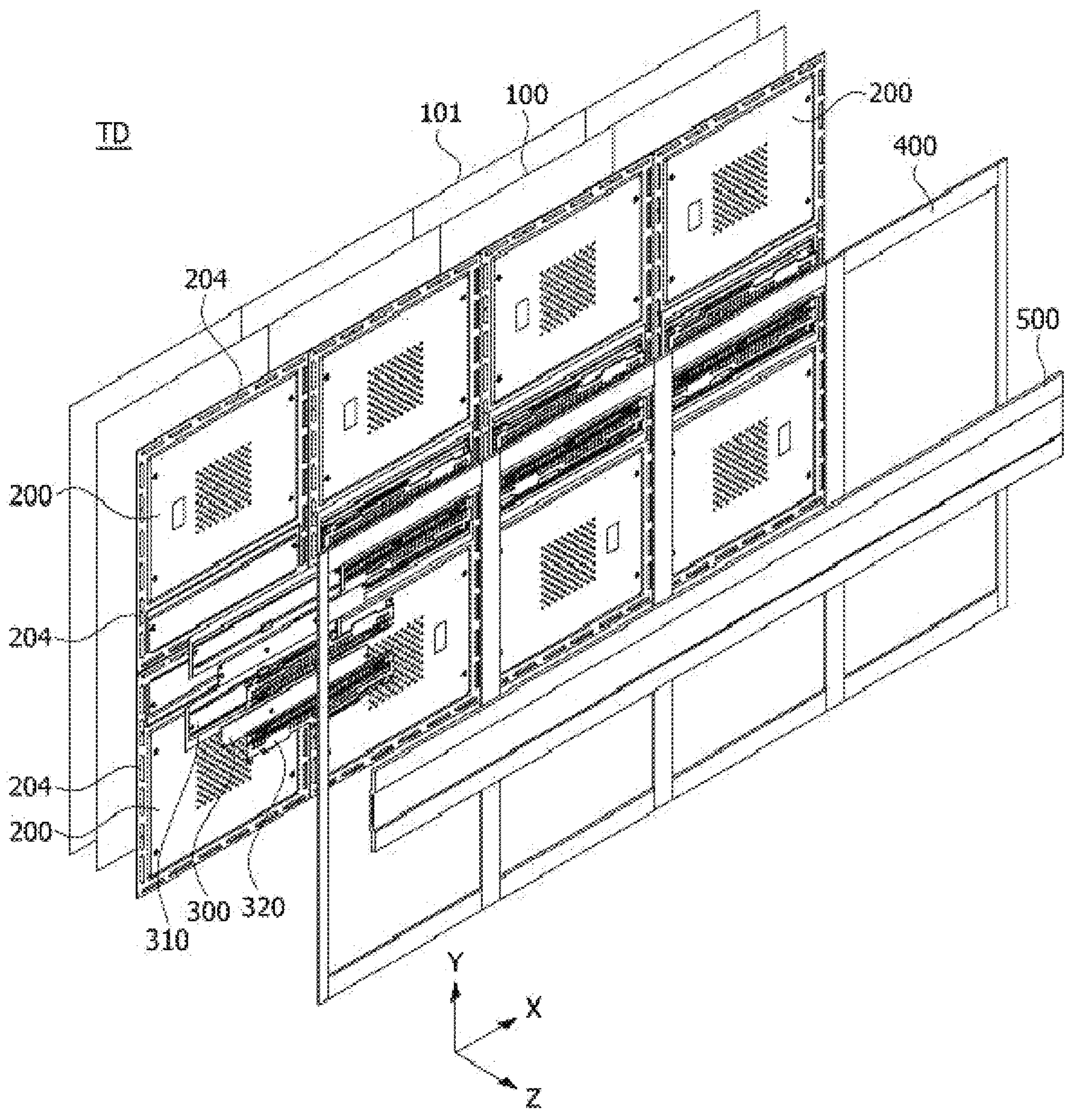
FIG. 21 is an exploded perspective view showing in detail the structure of the 4*2 display modules, the cabinet frame, and the heat sink arranged in the same manner as in FIG. 18 from the rear surface of a tiled display device according to one embodiment of the present disclosure.

As shown in FIG. 21, a heat sink 500 may be fastened (e.g., connected) to the display modules LDM1 to LDM8 or the cabinet frame 400 to cover one or more cover shields 320. FIG. 21 is an exploded perspective view showing in detail the structure of the 4*2 display modules LDM1 to LDM8, the cabinet frame, and the heat sink 500 arranged in the same manner as in FIG. 18.

Referring to FIG. 21, the heat sink 500 has a length in the X-axis direction, a width in the Y-axis direction, and a thickness in the Z-axis direction. One or more heat sinks 500 may be fastened to the rear surface of the tiled display device TD. The size, shape, thickness, and the like of the heat sink 500 may change depending on the location or size of the PCB disposed on the rear surface of the display module.

The length (X-axis direction) of the heat sink 500 may be substantially the same as, but not limited to, the length (X-axis direction) of the tiled display device TD. The width (Y-axis direction) of the heat sink 500 is smaller than the width (Y-axis direction) of one-piece display panel 100. The thickness (Z-axis direction) of the heat sink 500 may be greater than or equal to, but not limited to, the thickness (Z-axis direction) of one-piece display panel 100.

In FIG. 21, reference numeral '101' denotes a functional film attached to the front surface of the display panel 100.

Figure 22:
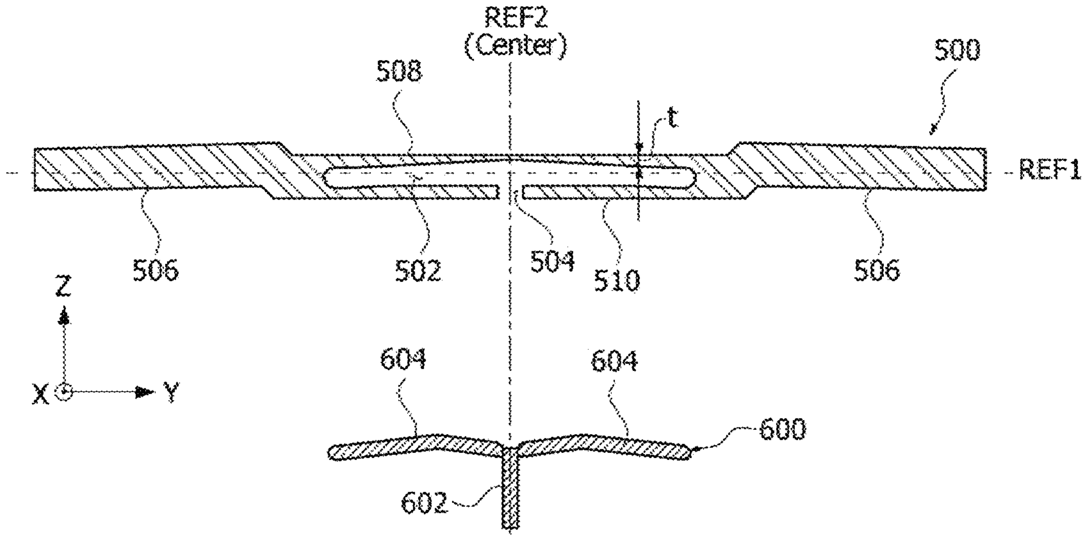
FIG. 22 is a cross-sectional view showing a structure of a heat sink and a support member according to one embodiment of the present disclosure.
Figure 23:
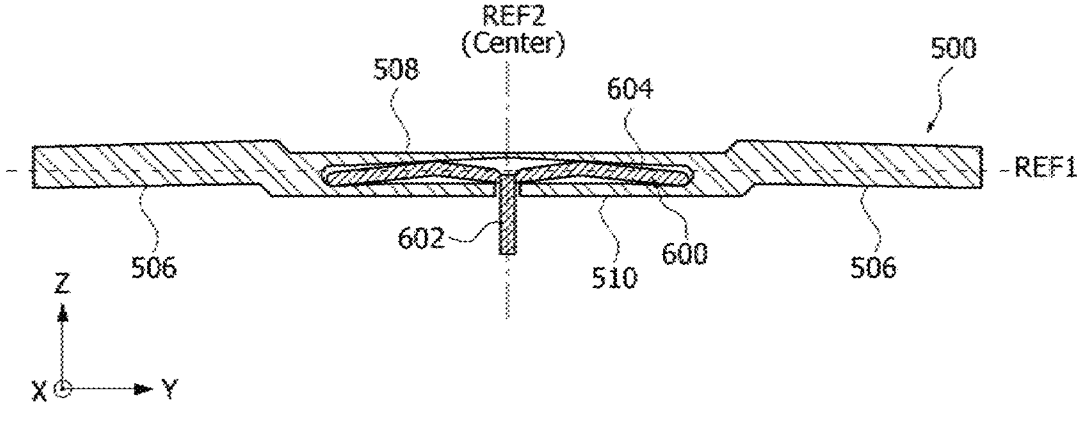
FIG. 23 is a cross-sectional view showing an example where the heat sink and the support member shown in FIG. 22 are fastened according to one embodiment of the present disclosure.

FIG. 22 is a cross-sectional view showing a structure of the heat sink 500 and the support member 600 according to one embodiment of the present disclosure. FIG. 23 is a cross-sectional view showing an example where the heat sink 500 and the support member 600 shown in FIG. 22 are fastened.

Referring to FIGS. 22 and 23, the heat sink 500 includes a central block (e.g., a central portion) having a hollow portion 502 and wing portions 506 connected to opposite sides of the central block. Thus, hollow portion 502 is between the wing portions 506 in the cross-section view of the heat sink 500. As shown in FIGS. 22 and 23, a first wing portion (e.g., the left wing) is connected to a first side (e.g., a left side) of the central block and a second wing portion (e.g., the right wing) is connected to a second side (e.g., a right side) of the central block that is opposite the first side. In one embodiment, the hollow portion 502 is disposed across a length of the heat sink 500 such as the entire length of the heat sink 500.

When viewed from a virtual horizontal reference line REF1 and a virtual vertical reference line REF2 that intersect at the center of the hollow portion of the heat sink 500, the heat sink 500 has a left-right symmetrical structure with respect to the vertical reference line REF2. The vertical reference line REF2 is parallel to the thickness direction (Z-axis direction) of the heat sink 500 and is perpendicular to the horizontal reference line REF1 parallel to the width direction (Y-axis direction) of the heat sink 500.

The central block and the wing portions 506 extending to opposite sides of the central block of the heat sink 500 may be substantially the same in thicknesses. As viewed from the horizontal reference line REF1, the wing portions 506 of the heat sink 500 with their thickness direction centers elevated upwardly on opposite sides of the central block are above the horizontal reference line REF1. Therefore, in the heat sink 500, there is a step between the top portion 508 of the central block and the wing portions 506, and a step between the bottom portion 510 of the central block and the wing portions 506.

Figure 24:
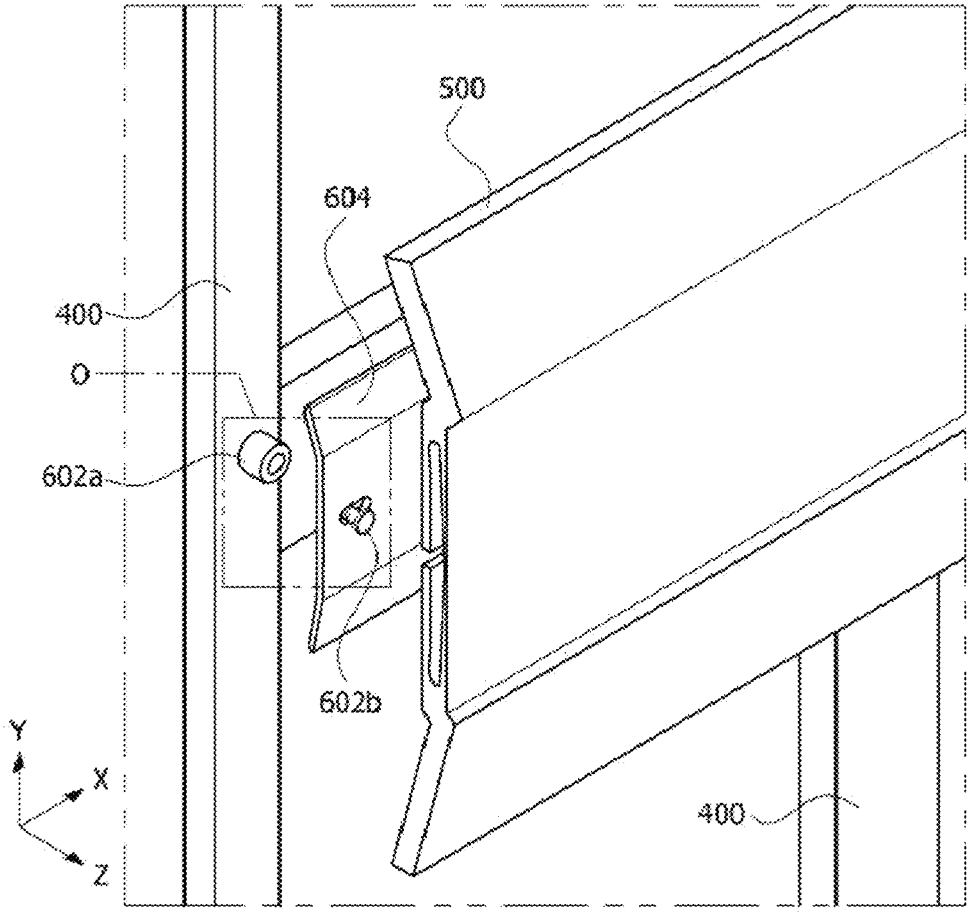
FIG. 24 is an exploded perspective view showing one example of a structure in which a heat sink and a support member are fastened to a cabinet frame according to one embodiment of the present disclosure.
Figure 26:
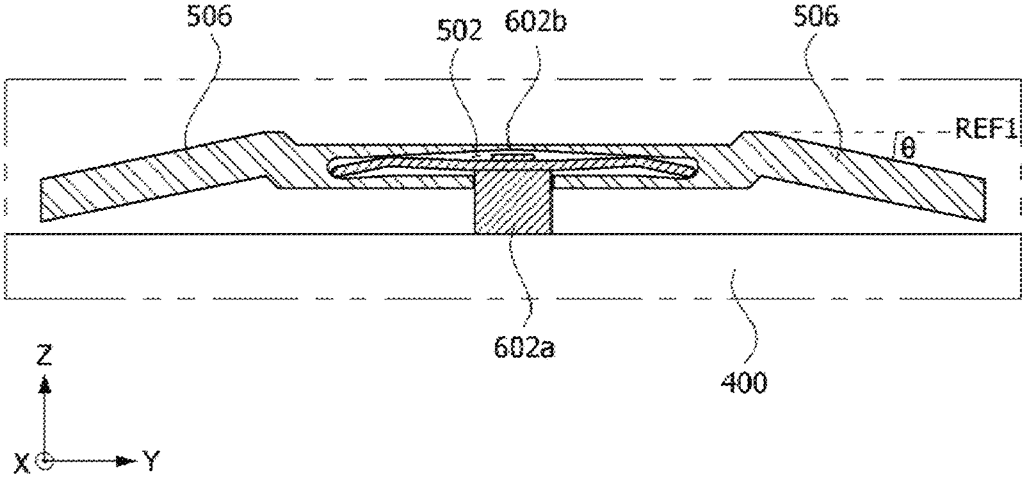
FIG. 26 is a cross-sectional view showing one example of a structure in which a heat sink and a support member are fastened to a cabinet frame according to one embodiment of the present disclosure.

As shown in FIGS. 24 and 26, the wing portions 506 of the heat sink 500 are bent with respect to the central block of the heat sink 500. In one embodiment, the wing portions 506 of the heat sink 500 may have an inclined surface (e.g., an angled surface) that is bent by a predetermined angle θ from the stepped portion with respect to the horizontal reference line REF1 and lowered toward the display module. In this case, the cross-sectional structure of the heat sink 500 has a bow shape.

The central block includes the top portion 508 that defines the top surface of the hollow portion 502 and the bottom portion 510 that defines the bottom surface of the hollow portion 502. In one embodiment, the hollow portion 502 is between the top portion 508 and the bottom portion 510 in a cross-section view of the heat sink 500. The bottom portion 510 includes an open hole 504 at its center, which is connected to the hollow portion 502. That is, the open hole 504 extends from a bottom surface of the heat sink 500 to the hollow portion 502.

In the heat sink 500, the center of the hollow portion 502 is large, and the depth of the hollow portion 50 in the thickness direction decreases toward opposite ends of the hollow portion 502. That is, a thickness of the hollow portion decreases towards ends of the hollow portion 502. Accordingly, the hollow portion 502 may have a cross-section that is approximately triangular- or hat-shaped. A thickness "t" of the top portion 508 of the central block gradually decreases toward the center of the hollow portion 502.

The support member 600 includes a support 602 vertically fixed to the rear surface of the display module or the cabinet frame, and wings 604 connected to the upper end of the support and bent in the shape of a gull wing. Each wing 604 horizontally extends from an upper end of the support 602. For example, the wings 604 include a first wing (e.g., a left wing) having an end connected to the upper end of the support 602 and a second wing (e.g., right wing) having an end connected to the upper end of the support 602. Each of the wings 604 of opposite sides of the support member 600 may have a cross-sectional structure of a gull wing shape, for example, a central portion thereof may be bent in an inverted "V" shape. An intermediate protrusion bent from the wings 604 of the support member 600 may approach or contact a surface of the top portion 508 within the hollow portion 502 of the heat sink 500. The ends of the wings 604 of the support member 600 may be close to or in contact with a surface of the bottom surface of the bottom portion 510 that is within the hollow portion 502 of the heat sink 500.

As illustrated in FIG. 23, when the heat sink 500 is connected to the support member 600, the wings 604 of the support member 600 are located in the hollow portion 502 of the heat sink 500, and the support member 602 traverses the open hole 504 of the heat sink 500. The heat sink 500 may be fastened to the support member 600 in a sliding manner while the support member 600 is fixed to the display module or the cabinet frame. That is, the heat sink 500 is configured to slide across the support member 600 to fasten the heat sink 500 to the support member 600.

Figure 25:
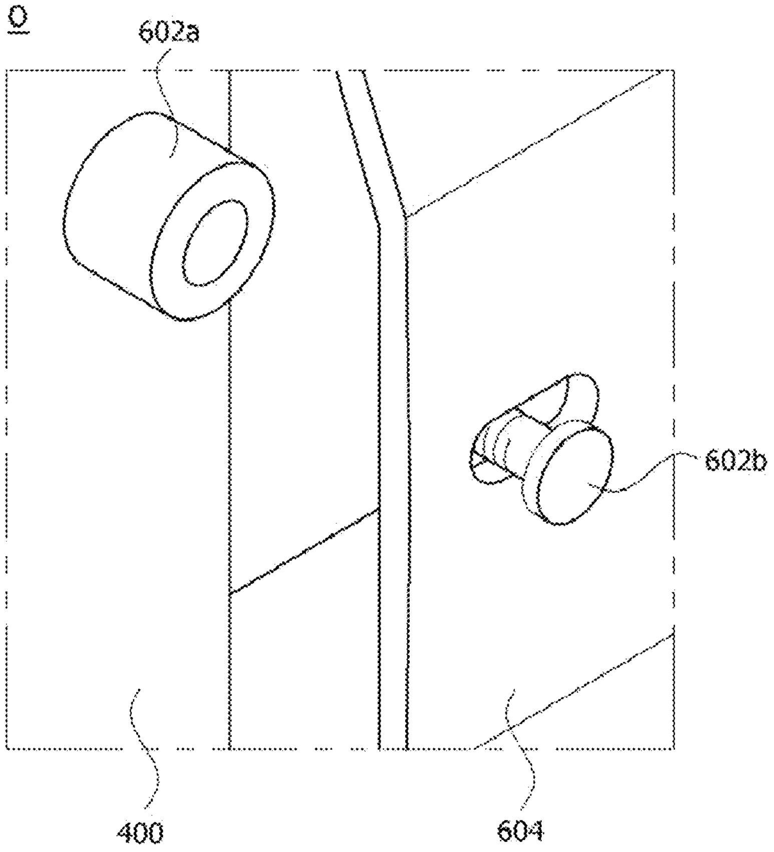
FIG. 25 is an enlarged view of a section marked "O" in FIG. 24 according to one embodiment of the present disclosure.

FIG. 24 is an exploded perspective view showing an example of a structure in which the heat sink 500 and the support member 600 are fastened to the cabinet frame 400 according to one embodiment of the present disclosure. FIG. 25 is an enlarged view of the section marked "O" in FIG. 24 according to one embodiment of the present disclosure. FIG. 26 is a cross-sectional view showing an example of a structure in which the heat sink 500 and the support member 600 are fastened to the cabinet frame 400 according to one embodiment of the present disclosure.

Referring to FIGS. 24 and 25, the support 602 may include a nut 602*a* having a predetermined height fastened to the cabinet frame 400 and a bolt 602*b* coupled to the nut 602*a* through a hole formed in the center of the wing 604. The head diameter of the bolt 602*b* may be larger than the diameter of the hole penetrating the wing 604, and thus the wing 604 may be fixed to the nut 602*a* of the support 602. Even when the support member 600 is fastened to the display module, the fastening structure shown in FIGS. 24 and 25 may be applicable.

Figure 27:
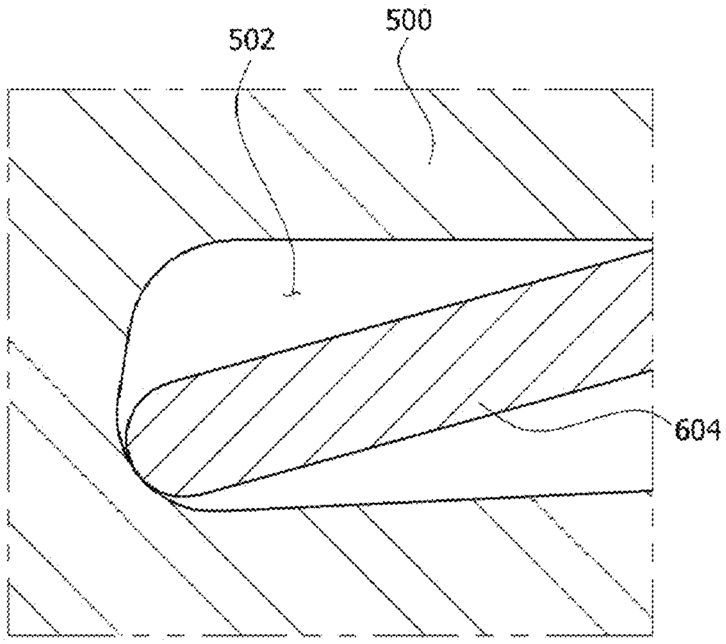
FIG. 27 is a diagram showing a structure in which the wings of the support member are inclined within the hollow portion in the heat sink shown in FIGS. 22 to 26 according to one embodiment of the present disclosure.

FIG. 27 is a diagram showing a structure in which the wings 604 of the support member 600 are inclined within the hollow portion 502 of the heat sink 500 shown in FIGS. 22 to 26.

Referring to FIG. 27, the wing 604 of the support member 600 may be inserted into the hollow portion 502 of the heat sink 500 in a state of being bent in the shape of a gull wing. In this case, the ends of the wings 604 of the support member 600 may contact the bottom portion 510 within the hollow portion 502 of the heat sink 500 and act as a leaf spring to push the heat sink 500 toward the cover shield 320 of the display module. In the tiled display device TD, a step may occur between the display modules due to thermal expansion between the display modules. In this case, the wing portions 506 of the heat sink 500 continuously press the rear surfaces of adjacent display modules, thereby increasing the heat dissipation efficiency and suppressing the occurrence of the step between display modules.

Figure 28:
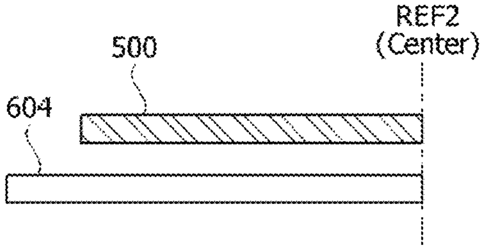
FIG. 28 is a diagram showing an example of the lengths of the heat sink and the wings of the support member shown in FIGS. 22 to 26.

Since the wings 604 of the support member 600 are bent, the wing length of the support member 600 may be, but is not limited to, longer than the length of the heat sink 500 as shown in FIG. 28. For example, the wing length of the support member 600 may vary depending on the size and depth of the hollow portion of the heat sink 500. FIG. 28 shows the length of the wings of the support member 600 in an unfolded state.

Figure 29:
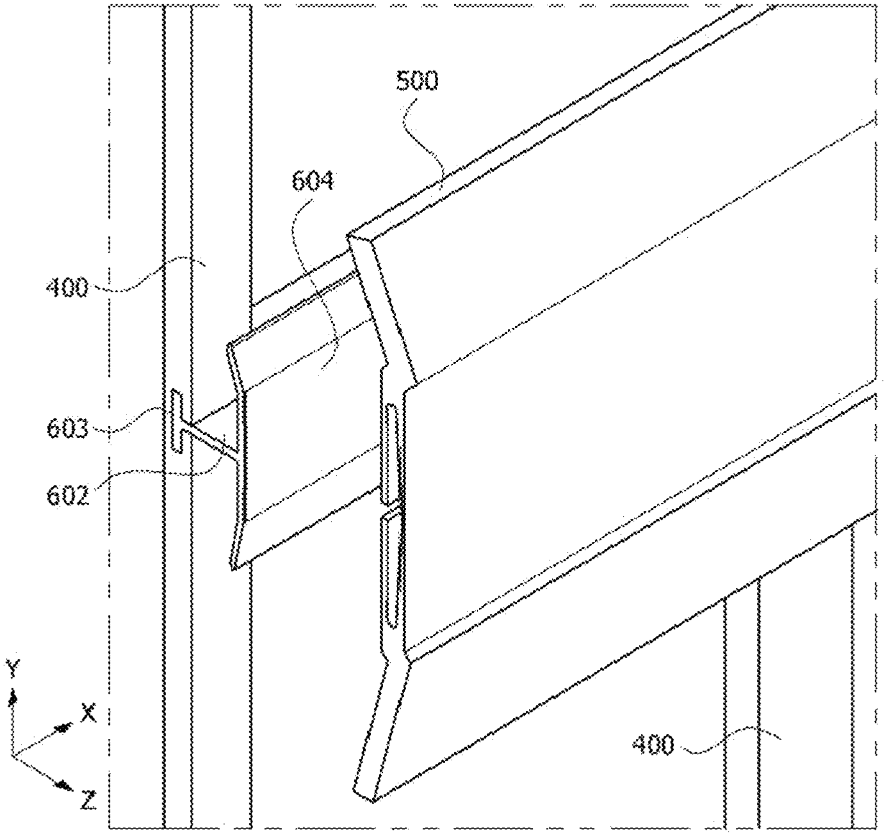
FIG. 29 is an exploded perspective view showing another example of a structure in which a heat sink and a support member are fastened to a cabinet frame according to one embodiment of the present disclosure.
Figure 30:
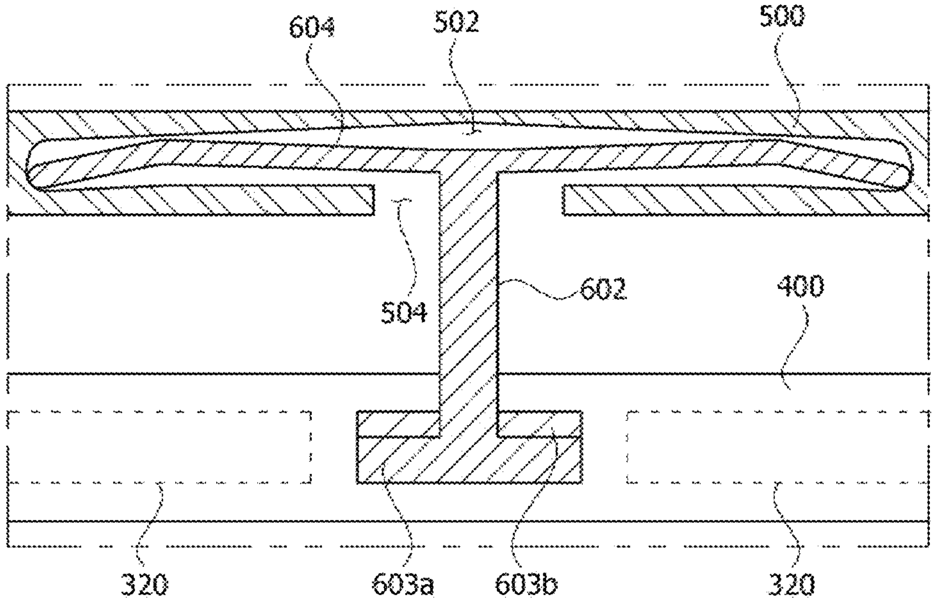
FIG. 30 is a cross-sectional view showing another example of a structure in which a heat sink and a support member are fastened to a cabinet frame according to one embodiment of the present disclosure.

FIG. 29 is an exploded perspective view showing another example of a structure in which the heat sink 500 and the support member 600 are fastened to the cabinet frame 400 according to one embodiment of the present disclosure. FIG. 30 is a cross-sectional view showing another example of a structure in which the heat sink 500 and the support member 600 are fastened to the cabinet frame 400 according to one embodiment of the present disclosure.

Referring to FIGS. 29 and 30, the support member 600 may be fastened to the cabinet frame 400 without threads. In an example, the support of the support member 600 may have a lower stepped portion 603. The cabinet frame 400 may be provided with a fastening groove having a stepped structure that is matched with the lower stepped portion 603 of the support. Using such a stepped structure to be fastened, the support of the support member 600 may be fitted into and fastened to the cabinet frame 400.

Figure 31:
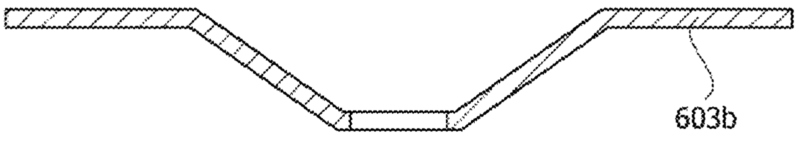
FIG. 31 is a cross-sectional view showing a cross-section of the leaf spring shown in FIG. 30 according to one embodiment of the present disclosure.

As shown in FIG. 30, a leaf spring 603*b* may be interposed between the support member 600 and the cabinet frame 400. The leaf spring 603*b* may have a structure in which wings of opposite sides are bent upward, as shown in FIG. 31. The leaf spring 603*b* may be disposed between the lower stepped portion 603*a* of the support member 600 and the cabinet frame 400 to press the lower stepped portion 603*a* of the support member 600. Even when the support member 600 is fastened to the display module, the fastening structure shown in FIGS. 29 and 30 may be applicable.

Figure 32:
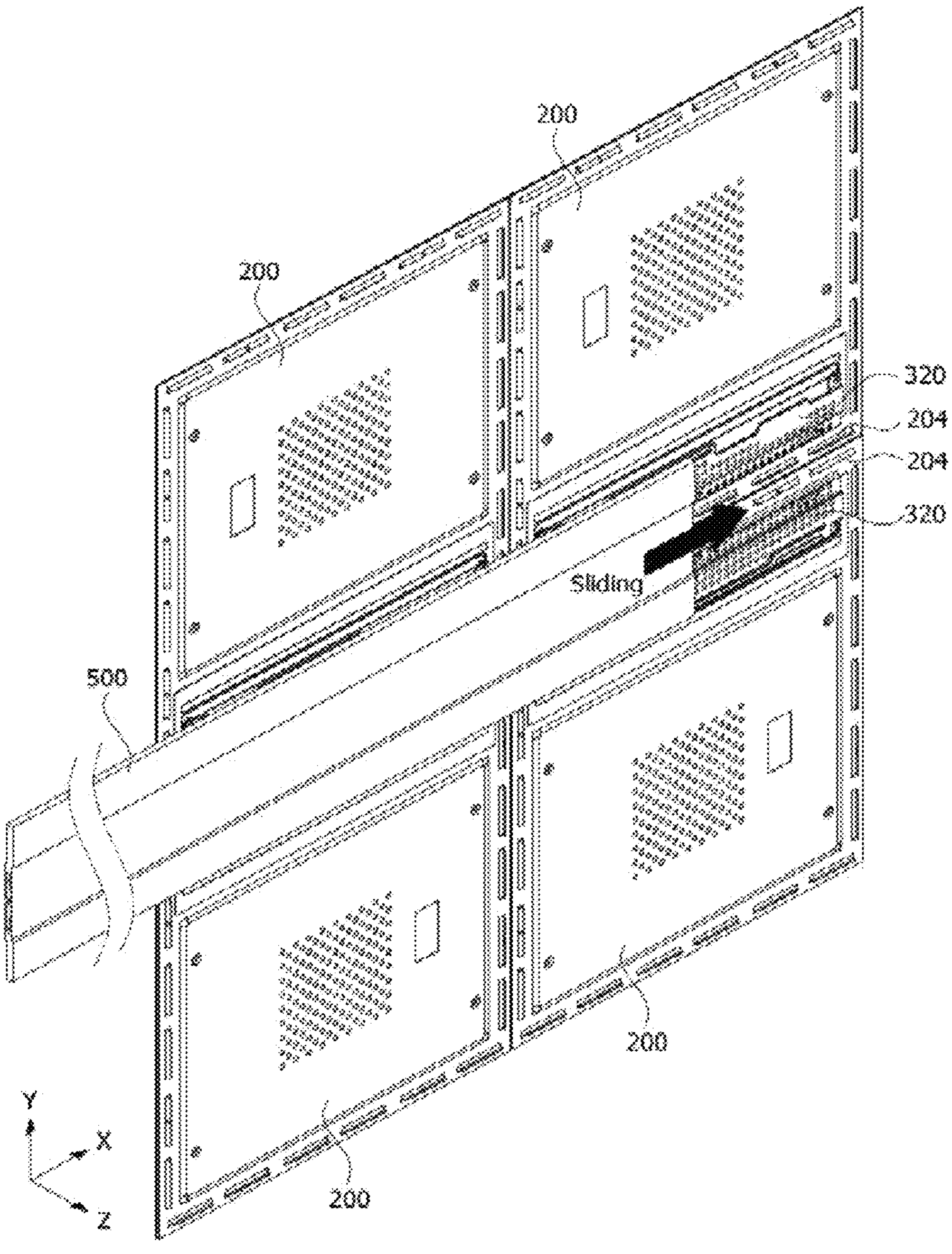
FIG. 32 is a diagram showing an example in which a heat sink is slidably fastened to a tiled display device according to one embodiment of the present disclosure.

FIG. 32 is a diagram showing an example in which the heat sink 500 is slidably fastened to the tiled display device TD according to one embodiment of the present disclosure.

Referring to FIG. 32, the heat sink 500 may be pushed into the support member 600 fastened to the display module or the cabinet frame in the longitudinal direction X and then be fastened to the support member 600. In this case, the wings 604 of the support member 600 are slidably fastened to the heat sink 500 within the hollow portion 502 of the heat sink 500.

When the length of the wings of the support member 600 increases due to the thermal expansion of the support member 600 having a gull wing structure and the bow-shaped heat sink 500, the wings of the support member 600 press the heat sink 500 toward the display module to reduce the thermal contact resistance, thereby increasing the heat transfer efficiency and suppressing the step between the adjacent display modules.

Figure 33:
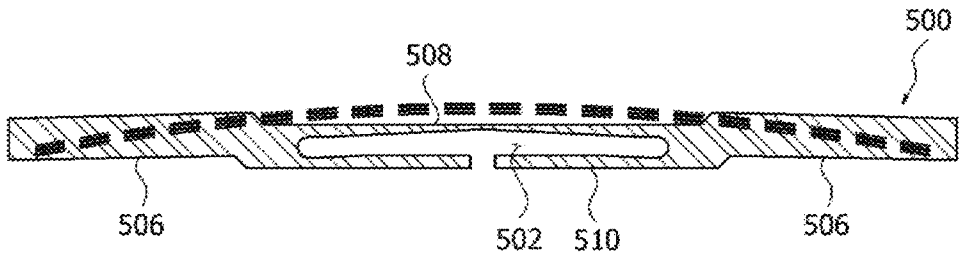
FIG. 33 is a cross-sectional view showing the forces acting on the wing portions of the heat sink according to one embodiment of the present disclosure.

In the fastening structure between the support member 600 and the heat sink 500, when the wings having the gull wing structure are disposed in the hollow portion 502 in the shape of a triangle or a bamboo hat, the support member 600 may apply pressure to draw the wing portions 506 of the heat sink 500 toward the cover shield 320 of the display module, as shown by the dotted line in FIG. 33, even without significantly taking into account the tolerance between the wings 604 of the support member 600 and the heat sink 500. In the fastening structure between the support member 600 and the heat sink 500, the outer and inner sizes of the support member 600 and the heat sink 500 may vary due to the occurrence of the space caused by thermal expansion and the temperature difference caused by the space. The wings 604 of the support member 600 may have a small contact area with the heat sink 500 so that the thermal expansion of the heat sink 500 is reduced and the heat sink 500 is held with greater force even when thermal deformation occurs.

Figure 34:
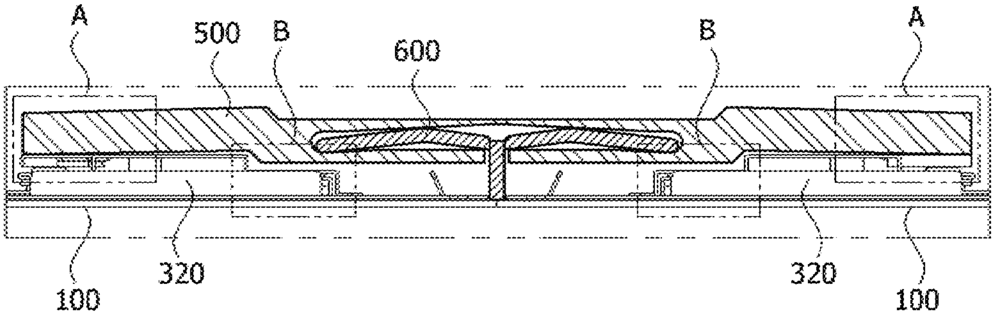
FIG. 34 is a cross-sectional view showing a high-temperature thermal expansion portion and a portion where a thermal pad or thermal interface material (TIM) is interposed, in a fastening structure between a support member having a gull wing structure and a bow-shaped heat sink according to one embodiment of the present disclosure.

In FIG. 34, "A" refers to a portion where the wing portions 506 of the heat sink 500 are pressed by the wing structure of the support member 600 during the high-temperature thermal expansion of the heat sink 500 in the fastening structure between the support member 600 having a gull wing structure and the bow-shaped heat sink 500. "B" refers to a portion where the bottom portion 510 of the heat sink 500 and the cover shield 320 of the display module are in contact. The portion B is a contact portion between the bottom portion 510 of the heat sink 500 and the cover shield 320. In the portion B, a heat transfer member, such as a thermal pad or a thermal interface material (TIM), may be interposed between the bottom portion 510 of the heat sink 500 and the cover shield 320, which reduces thermal contact resistance at the contact portion, improves thermal conductivity, and increases pressure between the heat sink 500 and the cover shield 320.

Figure 35:
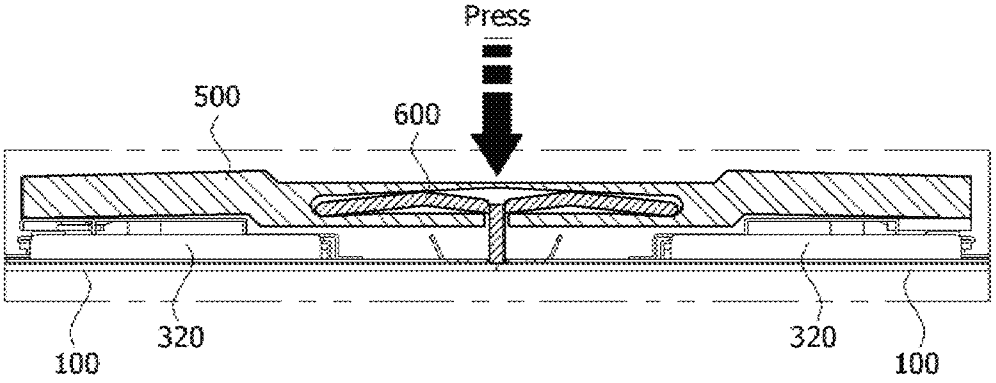
FIG. 35 is a diagram showing the external pressure created when a user presses on the center of the heat sink according to one embodiment of the present disclosure.
Figure 36:
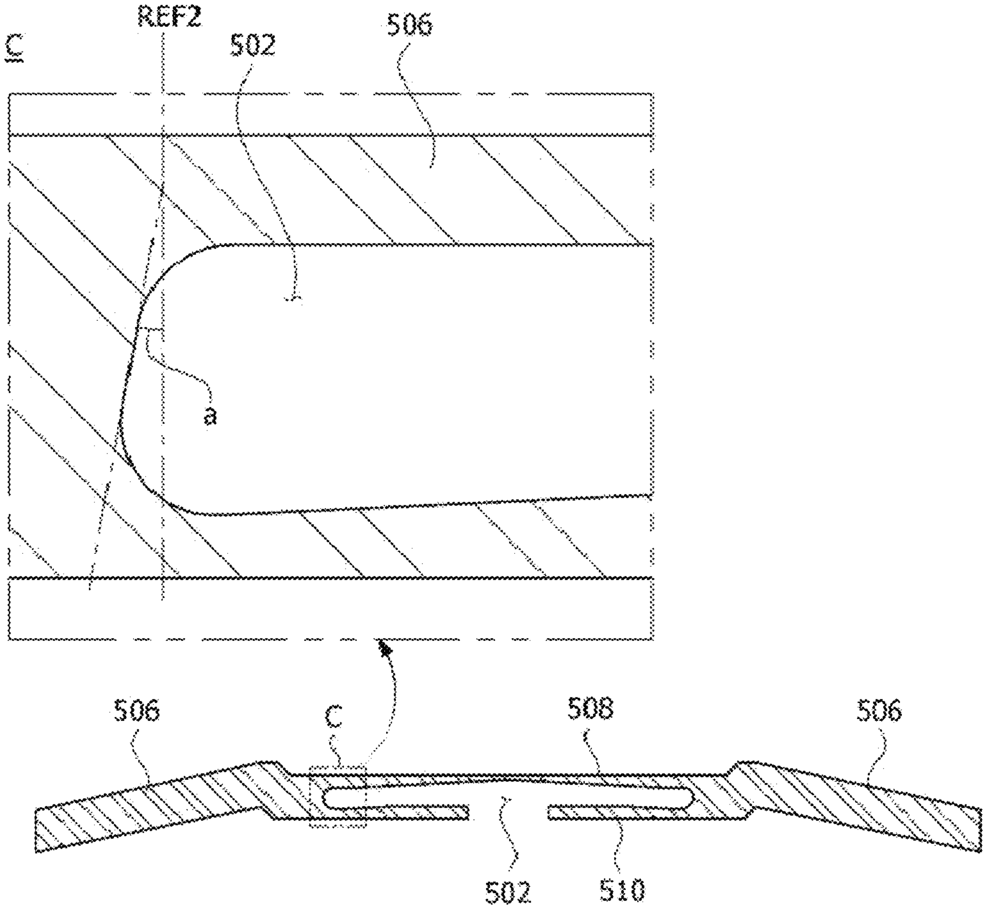
FIGS. 36 and 37 are diagrams showing before and after deformation of the heat sink during assembly of the heat sink according to one embodiment of the present disclosure.
Figure 37:
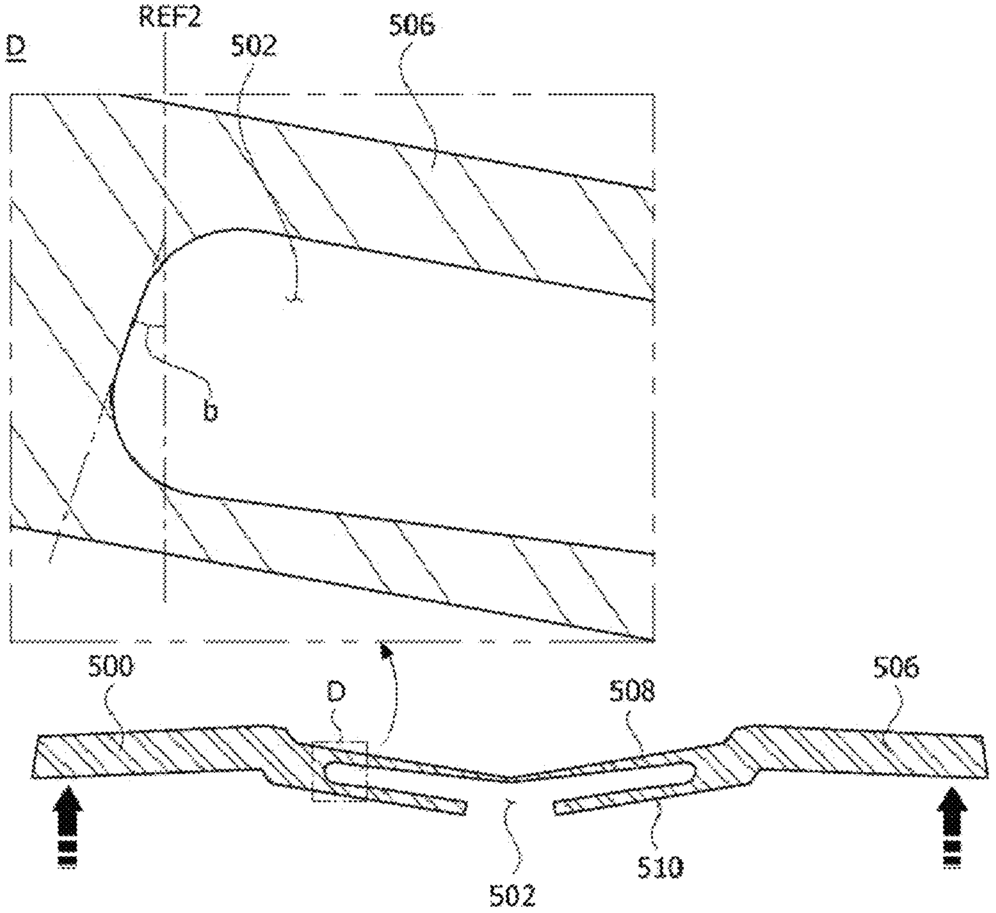

FIG. 35 is a diagram showing an external pressure created when a user presses on the center portion of the heat sink 500 from the outside according to one embodiment of the present disclosure. FIGS. 36 and 37 are diagrams showing before and after deformation of the heat sink during assembly of the heat sink according to one embodiment of the present disclosure. In FIG. 36, the upper portion is an enlarged view of the section marked "C" in the lower portion of the diagram. In FIG. 37, the upper portion is an enlarged view of the section marked "D" in the lower portion of the diagram.

In the fastening structure between the support member 600 having a gull wing structure and the bow-shaped heat sink 500, the contact force between the heat sink 500 and the cover shield 320 of the display module may be controlled by pressing the center portion of the heat sink 500 and the support member 600. There is a sufficient gap between the wings 604 of the support member 600 and the heat sink 500 within the hollow portion 502 of the heat sink 500, and the thickness of the top portion 508 of the central block of the heat sink 500 is thin at the center portion of the heat sink. Therefore, as shown in FIG. 35, the user may cause the contact portion of the heat sink 500 to separate from the cover shield 320 by pressing the center portion of the heat sink 500 from the rear surface of the display panel 100, which may in turn, as shown in FIGS. 36 and 37, cause the wing portions of the heat sink 500 to be pulled outwardly, allowing the contact portion of the heat sink 500 to separate. Since the thickness of the top portion 508 of the central block of the heat sink 500 is thin, the heat sink 500 may be easily deformed even with a small force. When the wing portions 506 of the heat sink 500 are pulled, the heat sink 500 may be deformed and enlarged, causing the heat sink 500 to be separated from the support member. In this case, a side angle of the hollow portion 502 of the heat sink 500 increases. In FIG. 36, "a" represents an angle between the side surface of the hollow portion of the heat sink 500 before its deformation and the vertical reference line REF2, and in FIG. 37, "b" represents an angle between the side surface of the hollow portion of the heat sink 500 after its deformation and the vertical reference line REF2 (b>a).

In the case where a heat transfer member is interposed in the contact area between the heat sink 500 and the cover shield 320, the heat transfer member may be pushed and rolled to a position other than the designed position when the heat sink 500 is slidably fastened to the support member 600. The heat transfer member may be attached to the designed position by pressing the center portion of the heat sink 500 as described above, or lifting the wing portions 506 on opposite sides of the heat sink 500.

Figure 38:
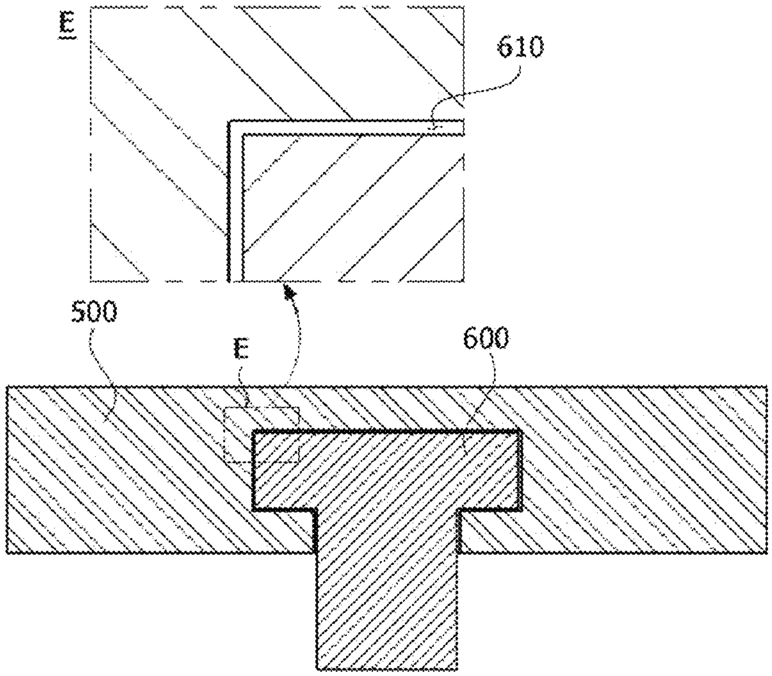
FIG. 38 is a cross-sectional view showing a structure of a heat sink and a support member according to another embodiment of the present disclosure.

FIG. 38 is a cross-sectional view showing a structure of the heat sink and the support member according to another embodiment of the present disclosure. In FIG. 38, the upper portion is an enlarged view of the section marked "E" in the lower portion of the diagram.

Referring to FIG. 38, the heat sink 500 has a hollow portion. This heat sink 500 has a block shape with a flat upper surface and a flat lower surface. The heat sink 500 includes an open hole connected to the hollow portion at the bottom portion beneath the hollow portion. The cross-section of the hollow portion and the open hole of the heat sink 500 may be, but is not limited to, a "T" shape.

The support member 600 includes a support vertically fixed to the rear surface of the display module or the cabinet frame, and wings connected to the upper end of the support and extending in the horizontal direction. The cross-sectional structure of the support member 600 may be in a "T" shape.

As illustrated in FIG. 38, when the heat sink 500 is connected to the support member 600, the wings of the support member 600 are located in the hollow portion of the heat sink 500, and the vertical support of the support member 600 traverses the open hole of the heat sink 500. The heat sink 500 may be fastened to the support member 600 in a sliding manner while the support member 600 is fixed to the display module or the cabinet frame.

In one embodiment, there is a predetermined void 610 or an assembly tolerance between the hollow portion of the heat sink 500 and the wings of the support member 600 so that the heat sink 500 and the support member 600 shown in FIG. 38 may be easily fastened.

Figure 39:
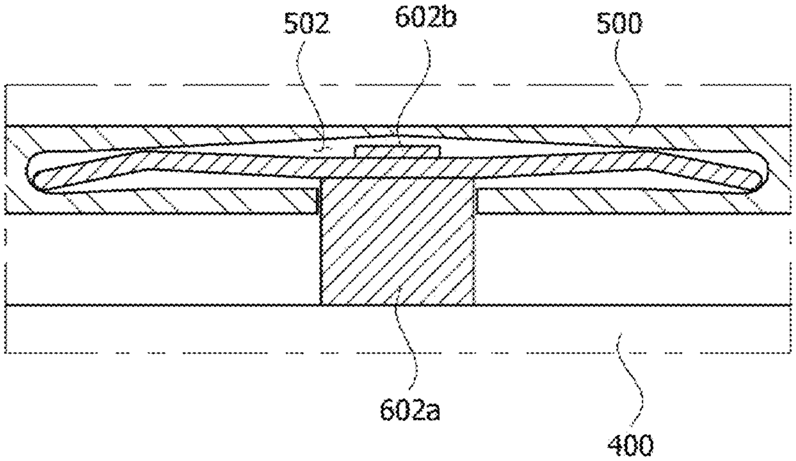
FIG. 39 is a cross-sectional view showing a structure of a heat sink and a support member according to further another embodiment of the present disclosure.

FIG. 39 is a cross-sectional view showing a structure of a heat sink and a support member according to further another embodiment of the present disclosure.

Referring to FIG. 39, the heat sink 500 has a hollow portion. This heat sink 500 has a block shape with a flat upper surface and a flat lower surface.

Similar to the bow-shaped heat sink described above, the hollow portion 502 of the heat sink 500 has a large central portion near the open hole and decreases in size toward its edges. In the heat sink 500, the thickness of the top portion defining the top surface of the hollow portion 502 decreases toward the center. An open hole is formed at the center of the bottom portion defining the bottom surface of the hollow portion 502, for communicating the hollow portion 502 with the outside air through the bottom portion.

The support member 600 includes a support vertically fixed to the rear surface of the display module or the cabinet frame, and wings connected to the upper end of the support and extending in the horizontal direction. The wings of the support member 600 may be bent in the shape of a seagull.

The support may include a nut 602*a* having a predetermined height fastened to the display module or the cabinet frame 400, and a bolt 602*b* coupled to the nut 602*a* through a hole formed in the center of the wing 604. The head diameter of the bolt 602*b* may be larger than the diameter of the hole penetrating the wing 604, and thus the wing 604 may be fixed to the nut 602*a* of the support.

Figure 40:
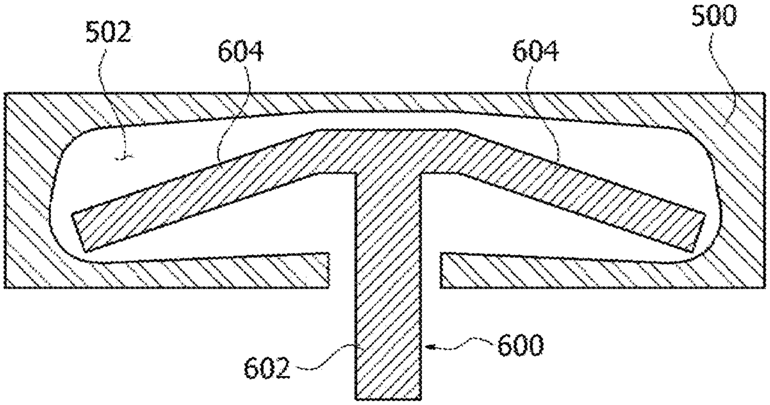
FIG. 40 is a cross-sectional view showing a structure of a heat sink and a support member according to still further another embodiment of the present disclosure.

FIG. 40 is a cross-sectional view showing a structure of a heat sink and a support member according to still further another embodiment of the present disclosure.

Referring to FIG. 40, the wings 604 on opposite sides of the support member 600 have a downwardly inclined structure. The cross-sectional structure of the support member 600 may be in the shape of an arrow or an umbrella. When the heat sink 500 is slidably fastened to the support member 600, the wings 604 on opposite sides of the support member 600 are positioned within the hollow portion of the heat sink 500. In this case, the ends of both wings 604 may be in contact with the bottom portion of the heat sink 500.

According to one or more embodiments of the present disclosure, a display device may be described as follows.

According to one or more embodiments of the present disclosure, a display device may include a display panel; a cover bottom configured to cover a rear surface of the display panel and having an opening exposing a portion of the display panel; a plate bottom disposed in the opening; a printed circuit board electrically connected to the display panel and disposed in the opening on the rear surface of the display panel; a cover shield configured to cover the printed circuit board; a support member fastened to at least one of the cover bottom, the plate bottom, the printed circuit board, and the cover shield; and a heat sink having a hollow portion into which an upper end of the support member is inserted. The heat sink may cover the cover shield and is at least partially in contact with the cover shield.

According to one or more embodiments of the present disclosure, the heat sink may include a central block which has an open hole configured to open the hollow portion to the outside so that a vertical support of the support member traverses the open hole; and wing portions connected to opposite sides of the central block.

According to one or more embodiments of the present disclosure, the wing portions of the heat sink may be bent over the central block.

According to one or more embodiments of the present disclosure, the wing portions of the heat sink may be inclined toward the cover shield.

According to one or more embodiments of the present disclosure, the hollow portion may decrease in size from the center of the hollow portion toward the opposite ends of the hollow portion.

According to one or more embodiments of the present disclosure, the central block may include a top portion located above the hollow portion and decreasing in thickness toward the center of the hollow portion; and a bottom portion located below the hollow portion and provided with the open hole at the center of the hollow portion.

According to one or more embodiments of the present disclosure, the support member may include a vertical support fastened to at least one of the cover bottom, the plate bottom, the printed circuit board, and the cover shield; and wings connected to opposite sides of the upper end of the vertical support.

According to one or more embodiments of the present disclosure, each of the wings of the support member may have a central portion that is bent and an end that contacts a bottom portion located below the hollow portion within the hollow portion of the heat sink.

According to one or more embodiments of the present disclosure, the heat sink may be fastened to the support member in a sliding manner.

According to one or more embodiments of the present disclosure, a contact portion of the heat sink may be separated from the cover shield when a center portion of the heat sink is pressed from the rear surface of the display module.

According to one or more embodiments of the present disclosure, the support member may have one of a gull wing structure, a “T” shape cross-sectional structure and an arrow shape cross-sectional structure.

According to one or more embodiments of the present disclosure, a display device may include a plurality of display modules; a frame to which the display modules are fastened; a support member fastened to at least one of the display modules or the frame; and a heat sink fastened to the support member. Each of the display modules may include a display panel; a printed circuit board disposed on a rear surface of the display panel; and a cover shield configured to cover the printed circuit board. The heat sink may cover the cover shield and is at least partially in contact with the cover shield.

According to one or more embodiments of the present disclosure, for each of the display modules, the printed circuit board and the cover shield may be disposed biased toward one side of the rear surface of the display panel. Odd-numbered display modules disposed in odd-numbered rows and even-numbered display modules disposed in even-numbered rows may fastened to the frame in the same direction.

According to one or more embodiments of the present disclosure, for each of the display modules, the printed circuit board and the cover shield may be disposed biased toward one side of the rear surface of the display panel. Odd-numbered display modules arranged in odd-numbered rows and even-numbered display modules arranged in even-numbered rows may be fastened to the frame in the reverse direction.

According to one or more embodiments of the present disclosure, one heat sink may cover the cover shields of the odd-numbered display modules and the cover shields of the even-numbered display modules. The one heat sink may contact the cover shields of the odd-numbered display modules and the cover shields of the even-numbered display modules.

According to one or more embodiments of the present disclosure, the heat sink may include a central block which has a hollow portion and an open hole configured to open the hollow portion to the outside so that a vertical support of the support member traverses the open hole; and wing portions connected to opposite sides of the central block.

According to one or more embodiments of the present disclosure, the hollow portion may decrease in size from the center of the hollow portion toward the opposite ends of the hollow portion. The central block may include a top portion located above the hollow portion and decreasing in thickness toward the center of the hollow portion; and a bottom portion located below the hollow portion and provided with the open hole at the center of the hollow portion.

According to one or more embodiments of the present disclosure, the support member may include a vertical support fastened to the frame; and wings connected to opposite sides of the upper end of the vertical support.

According to one or more embodiments of the present disclosure, each of the wings of the support member may have a central portion that is bent and an end that contacts a bottom portion located below the hollow portion within the hollow portion of the heat sink.

According to one or more embodiments of the present disclosure, the display device may further include a leaf spring interposed between the lower end of the vertical support and the frame.

According to one or more embodiments of the present disclosure, the heat sink may be fastened to the support member in a sliding manner.

According to one or more embodiments of the present disclosure, a contact portion of the heat sink may be separated from the cover shield when a center portion of the heat sink is pressed from the rear surface of the display module.

According to one or more embodiments of the present disclosure, the support member may have one of a gull wing structure, a “T” shape cross-sectional structure and an arrow shape cross-sectional structure.

According to one or more embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display device according to one or more embodiments of the present disclosure may be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device comprising:
- a display panel;
- a cover bottom that covers a rear surface of the display panel, the cover bottom including an opening that exposes a portion of the display panel;
- a plate bottom in the opening;
- a printed circuit board electrically connected to the display panel and in the opening on the rear surface of the display panel;
- a cover shield that covers the printed circuit board;
- a support member fastened to at least one of the cover bottom, the plate bottom, the printed circuit board, or the cover shield, the support member including an upper end; and
- a heat sink including a hollow portion and the upper end of the support member is in the hollow portion,
- wherein the heat sink covers the cover shield and is at least partially in contact with the cover shield.

2. The display device of claim 1, wherein the heat sink comprises:
- a central portion including a hole that extends from a surface of the central portion to the hollow portion and the upper end of the support member is disposed within the hollow portion via the hole; and
- a plurality of wing portions including a first wing portion connected to a first side of the central portion and a second wing portion connected to a second side of the central portion that is opposite the first side of the central portion.

3. The display device of claim 2, wherein the plurality of wing portions of the heat sink are bent with respect to the central portion.

4. The display device of claim 3, wherein the plurality of wing portions of the heat sink are inclined toward the cover shield.

5. The display device of claim 2, wherein a thickness of the hollow portion decreases from a center of the hollow portion toward opposite ends of the hollow portion.

6. The display device of claim 5, wherein the central portion further comprises:
- a top portion above the hollow portion, the top portion having a thickness that decreases toward the center of the hollow portion from ends of the central portion; and
- a bottom portion located below the hollow portion such that the hollow portion is between the top portion and the bottom portion, the bottom portion including the hole at the center of the hollow portion.

7. The display device of claim 6, wherein the support member comprises:
- a vertical support fastened to at least one of the cover bottom, the plate bottom, the printed circuit board, or the cover shield, the vertical support including the upper end; and
- a plurality of wings including a first wing having a first end connected to the upper end of the vertical support and a second wing having a first end connected to the upper end of the vertical support.

8. The display device of claim 7, wherein each of the first wing and the second wing of the support member has a portion that is bent and a second end that extends from the bent portion and contacts a surface of the bottom portion that is within the hollow portion of the heat sink.

9. The display device of claim 1, wherein the heat sink is configured to slide across the support member to fasten the heat sink to the support member.

10. The display device of claim 1, wherein a contact portion of the heat sink is configured to separate from the cover shield responsive to a center portion of the heat sink being pressed from the rear surface of the display panel.

11. The display device of claim 1, wherein the support member has one of a gull wing structure, a "T" shape cross-sectional structure, or an arrow shape cross-sectional structure.

12. A display device comprising:
- a plurality of display modules;
- a frame that is fastened to the plurality of display modules;
- a support member fastened to at least one of the frame or the plurality of display modules; and
- a heat sink fastened to the support member, wherein each of the plurality of display modules includes:
  - a display panel;
  - a printed circuit board on a rear surface of the display panel; and
  - a cover shield that covers the printed circuit board,
  - wherein the heat sink covers the cover shield and is at least partially in contact with the cover shield,
- wherein a part of the support member is movably coupled in a hollow portion of the heat sink.

13. The display device of claim 12, wherein for each of the plurality of display modules:
- the printed circuit board and the cover shield are biased toward one side of the rear surface of the display panel; and
- the plurality of display modules are arranged in a plurality of numbered rows and odd-numbered display modules from the plurality of display modules in odd-numbered rows and even-numbered display modules from the plurality of display modules in even-numbered rows are fastened to the frame in a same direction such that the printed circuit boards of the odd-numbered display modules and the printed circuit boards of the even-numbered display modules are spaced apart from each other.

14. The display device of claim 12, wherein for each of the plurality of display modules:

the printed circuit board and the cover shield are biased toward one side of the rear surface of the display panel; and the plurality of display modules are arranged in a plurality of numbered rows and odd-numbered display modules arranged in odd-numbered rows and even-numbered display modules arranged in even-numbered rows are fastened to the frame in a reverse direction such that the printed circuit boards of the odd-numbered display modules and the printed circuit boards of the even-numbered display modules are adjacent to each other.

15. The display device of claim 13, wherein the heat sink covers cover shields of the odd-numbered display modules and cover shields of the even-numbered display modules and contacts the cover shields of the odd-numbered display modules and the cover shields of the even-numbered display modules.

16. The display device of claim 12, wherein the heat sink comprises:

a central portion including a hole that extends from a surface of the central portion to the hollow portion, wherein a vertical support is disposed within the hollow portion via the hole; and a plurality of wing portions including a first wing portion connected to a first side of the central portion and a second wing portion connected to a second side of the central portion that is opposite the first side of the central portion.

17. The display device of claim 16, wherein a thickness of the hollow portion decreases from a center of the hollow portion toward opposite ends of the hollow portion, and the central portion further comprises:

a top portion above the hollow portion, the top portion having a thickness that decreases toward the center of the hollow portion from ends of the central portion; and a bottom portion located below the hollow portion such that the hollow portion is between the top portion and the bottom portion, the bottom portion including the hole at the center of the hollow portion.

18. The display device of claim 17, wherein the support member includes:

the vertical support that is fastened to the frame; and a plurality of wings including a first wing having a first end connected to an upper end of the vertical support and a second wing having a first end connected to the upper end of the vertical support.

19. The display device of claim 18, wherein each of the first wing and the second wing of the support member has a portion that is bent and a second end that contacts a surface of the bottom portion that is within the hollow portion of the heat sink.

20. The display device of claim 18, further comprising:

a leaf spring between a lower end of the vertical support and the frame.

21. The display device of claim 12, wherein the heat sink is configured to slide across the support member to fasten the heat sink to the support member.

22. The display device of claim 12, wherein a contact portion of the heat sink is configured to separate from the cover shield responsive to a center portion of the heat sink being pressed from the rear surface of the display module.

23. The display device of claim 12, wherein the support member has one of a gull wing structure, a "T" shape cross-sectional structure and an arrow shape cross-sectional structure.

24. A display device comprising:

a display panel;

a printed circuit board electrically connected to the display panel, the printed circuit board over a rear surface of the display panel;

a heat sink that overlaps the printed circuit board such that the printed circuit board is between the display panel and the heat sink, the heat sink including a hollow portion across a length of the heat sink; and a support member having a first end that is disposed within the hollow portion and a second end, wherein the heat sink comprises:

a central portion including a hole that extends from a surface of the central portion to the hollow portion and the first end of the support member is disposed within the hollow portion via the hole; and a plurality of wing portions including a first wing portion connected to a first side of the central portion and a second wing portion connected to a second side of the central portion that is opposite the first side of the central portion.

25. The display panel of claim 24, wherein the heat sink is configured to slide across the first end of the support member to fasten the heat sink to the support member.

26. The display panel of claim 25, further comprising:

a cover shield that covers the printed circuit board, wherein the second end of the support member is fastened to at least one of the printed circuit board or the cover shield.

27. The display panel of claim 26, wherein the first wing portion and the second wing portion are at least partially in contact with the cover shield.

28. The display device of claim 27, wherein the plurality of wing portions of the heat sink are angled toward the cover shield.

29. The display device of claim 27, wherein the support member further comprises:

a plurality of wings including a first wing having a first end connected to the first end of the support member and a second wing having a first end connected to the first end of the support member, wherein each of the first wing and the second wing of the support member has a portion that is bent and a second end that extends from the bent portion and contacts a surface of the central portion that is within the hollow portion of the heat sink.

* * * * *